(12) United States Patent
de Ruijter et al.

(10) Patent No.: US 11,177,993 B2
(45) Date of Patent: Nov. 16, 2021

(54) APPARATUS FOR RADIO FREQUENCY RECEIVER WITH IMPROVED TIMING RECOVERY AND FREQUENCY OFFSET ESTIMATION AND ASSOCIATED METHODS

(71) Applicant: Silicon Laboratories Inc., Austin, TX (US)

(72) Inventors: Hendricus de Ruijter, Austin, TX (US); Wentao Li, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 16/177,373

(22) Filed: Oct. 31, 2018

(65) Prior Publication Data

US 2019/0081834 A1 Mar. 14, 2019

Related U.S. Application Data

(63) Continuation-in-part of application No. 15/164,363, filed on May 25, 2016, now Pat. No. 10,172,105, which is a continuation-in-part of application No. 13/949,837, filed on Jul. 24, 2013, now Pat. No. 9,720,875, which is a continuation-in-part of application No. 14/080,405, filed on Nov. 14, 2013, now Pat. No. 10,061,740.

(51) Int. Cl.
| | |
|---|---|
| *H04L 27/26* | (2006.01) |
| *H04W 56/00* | (2009.01) |
| *H04L 27/00* | (2006.01) |
| *H04L 27/38* | (2006.01) |

(52) U.S. Cl.
CPC ........ *H04L 27/266* (2013.01); *H04L 27/0014* (2013.01); *H04L 27/3863* (2013.01); *H04W 56/001* (2013.01); *H04W 56/005* (2013.01); *H04W 56/0035* (2013.01); *H04L 2027/0026* (2013.01); *H04L 2027/0065* (2013.01)

(58) Field of Classification Search
None
See application file for complete search history.

(56) References Cited

U.S. PATENT DOCUMENTS

| | | | |
|---|---|---|---|
| 6,961,393 B1* | 11/2005 | Cupo | H04L 27/2647 375/150 |
| 8,295,404 B1 | 10/2012 | Husted | |
| 9,100,080 B2* | 8/2015 | Wichlund | H04B 1/12 |
| 10,172,105 B2 | 1/2019 | De Ruijter | |
| 2002/0145971 A1 | 10/2002 | Cho | |
| 2004/0005022 A1* | 1/2004 | Zhu | H04L 27/2675 375/365 |
| 2005/0249307 A1 | 11/2005 | Yu | |
| 2006/0291550 A1* | 12/2006 | Wang | H04L 27/0014 375/229 |
| 2012/0288040 A1 | 11/2012 | Yi | |
| 2013/0022148 A1 | 1/2013 | Sagi | |

* cited by examiner

*Primary Examiner* — Brian S Roberts
(74) *Attorney, Agent, or Firm* — Law Offices of Maximilian R. Peterson

(57) ABSTRACT

An apparatus includes a radio frequency (RF) receiver. The RF receiver includes a timing correlator and frequency offset estimator. The timing correlator and frequency offset estimator: (a) extracts timing from a set of samples derived from an RF signal, and (b) determines a frequency offset estimate from the set of samples.

20 Claims, 16 Drawing Sheets

APPARATUS FOR RADIO FREQUENCY RECEIVER WITH IMPROVED TIMING RECOVERY AND FREQUENCY OFFSET ESTIMATION AND ASSOCIATED METHODS

CROSS-REFERENCE TO RELATED APPLICATIONS

This application is a continuation-in part of U.S. patent application Ser. No. 15/164,363, filed on May 25, 2016, titled "Apparatus for Receiver With Multi-Bit Observation Interval and Associated Methods," which is a continuation-in part of: (1) U.S. patent application Ser. No. 14/080,405, filed on Nov. 14, 2013, titled "Receiver with Signal Arrival Detection Capability," U.S. Pat. No. 10,061,740, and (2) of U.S. patent application Ser. No. 13/949,837, filed on Jul. 24, 2013, titled "Receiver with Signal Arrival Detection Capability," U.S. Pat. No. 9,720,875. The foregoing applications are incorporated by reference for all purposes. The instant application is also related to U.S. patent application Ser. No. 15/168,080, filed on May 29, 2016, titled "Apparatus for Receiver With Signal Arrival Detector and Associated Methods".

TECHNICAL FIELD

The disclosure relates generally to communication apparatus and associated methods. More particularly, the disclosure relates to radio frequency (RF) apparatus with improved timing recovery and frequency offset estimation/compensation, and associated methods.

BACKGROUND

With the increasing proliferation of wireless technology, such as Wi-Fi, Bluetooth, and mobile or wireless Internet of things (IoT) devices, more devices or systems incorporate RF circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry. A variety of types and circuitry for transmitters and receivers are used. Transmitters send or transmit information via a medium, such as air, using RF signals. Receivers at another point or location receive the RF signals from the medium, and retrieve the information. Typically, transmitters transmit coded data via RF signals. Receivers receive, decode, demodulate, etc. the RF signals to retrieve the data.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame. In the M-bus frame protocol, this next portion is a synchronization (SYNC) word. Under certain circumstances, the preamble detector can occasionally provide a false trigger, such as when a co-channel continuous wave (CW) tone is received at around sensitivity of the preamble detector, or when certain noise patterns are received.

The description in this section and any corresponding figure(s) are included as background information materials. The materials in this section should not be considered as an admission that such materials constitute prior art to the present patent application.

SUMMARY

A variety of communication apparatus and associated methods are contemplated. According to one exemplary embodiment, an apparatus includes an RF receiver. The RF receiver includes a timing correlator and frequency offset estimator. The timing correlator and frequency offset estimator: (a) extracts timing from a set of samples derived from an RF signal, and (b) determines a frequency offset estimate from the set of samples.

According to another exemplary embodiment, an IC includes an RF receiver, which includes a Coordinate Rotation Digital Computer (Cordic) circuit to receive in-phase and quadrature signals derived from RF signals and to generate phase and amplitude signals. The RF receiver further includes a timing correlator and frequency offset estimator coupled to receive a set of samples of the phase signals and to perform: (a) timing extraction from the set of samples, and (b) frequency offset estimation from the set of samples.

According to another exemplary embodiment, a method of receiving RF signals includes extracting timing from the RF signals by performing timing correlation on a set of samples derived from the RF signals. The method further includes determining a frequency offset estimate by using the set of samples derived from the RF signals.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication apparatus and circuitry, such as RF receivers or transceivers. More specifically, the disclosed concepts provide apparatus and associated methods for RF apparatus with improved timing recovery and frequency offset estimation/compensation.

One aspect of the disclosure relates to RF receivers with multi-bit observation intervals. Receivers using CPM techniques may use a variety of modulation techniques. Without limitation, examples include continuous phase m-ary frequency shift keying (FSK), Gaussian FSK (GFSK), minimum shift keying (MSK), and Gaussian MSK. When used, Gaussian filtering and channel filtering cause a partial response, which causes deterministic inter symbol interference (ISI). In other words, a certain number of adjacent symbols interfere with each other in a deterministic manner.

The amount of ISI is known so that maximum likelihood sequence estimation (MLSE) can be used to determine the symbol sequence. Use of MLSE allows a reduction in the channel filter bandwidth, which helps to reduce noise, improve immunity against signal interference, and also improves receiver sensitivity.

An efficient way to implement MLSE is by using the Viterbi technique (or algorithm or method or decoding). Receivers according to exemplary embodiments use and implement the Viterbi technique, such as a Viterbi decoder, as described below in detail. Furthermore, receivers according to exemplary embodiments use multi-bit observation intervals. The observation interval is generally equal to the trace back depth in the Viterbi decoder.

In general, receiver performance (e.g., bit error rate (BER), signal to noise ratio (SNR), etc.) improves as the size of the observation interval increases (e.g., from two bits to four bits). The improvement in performance often entails increased complexity of the receiver. A tradeoff may be made between the performance improvement and factors such as receiver cost, complexity, size, etc. As described below in detail, a cost function that is attached to or related to the bit value is also used. If the deviation from the expected value of a bit is relatively large, a high cost value is used, and vice-versa.

Figure 1:
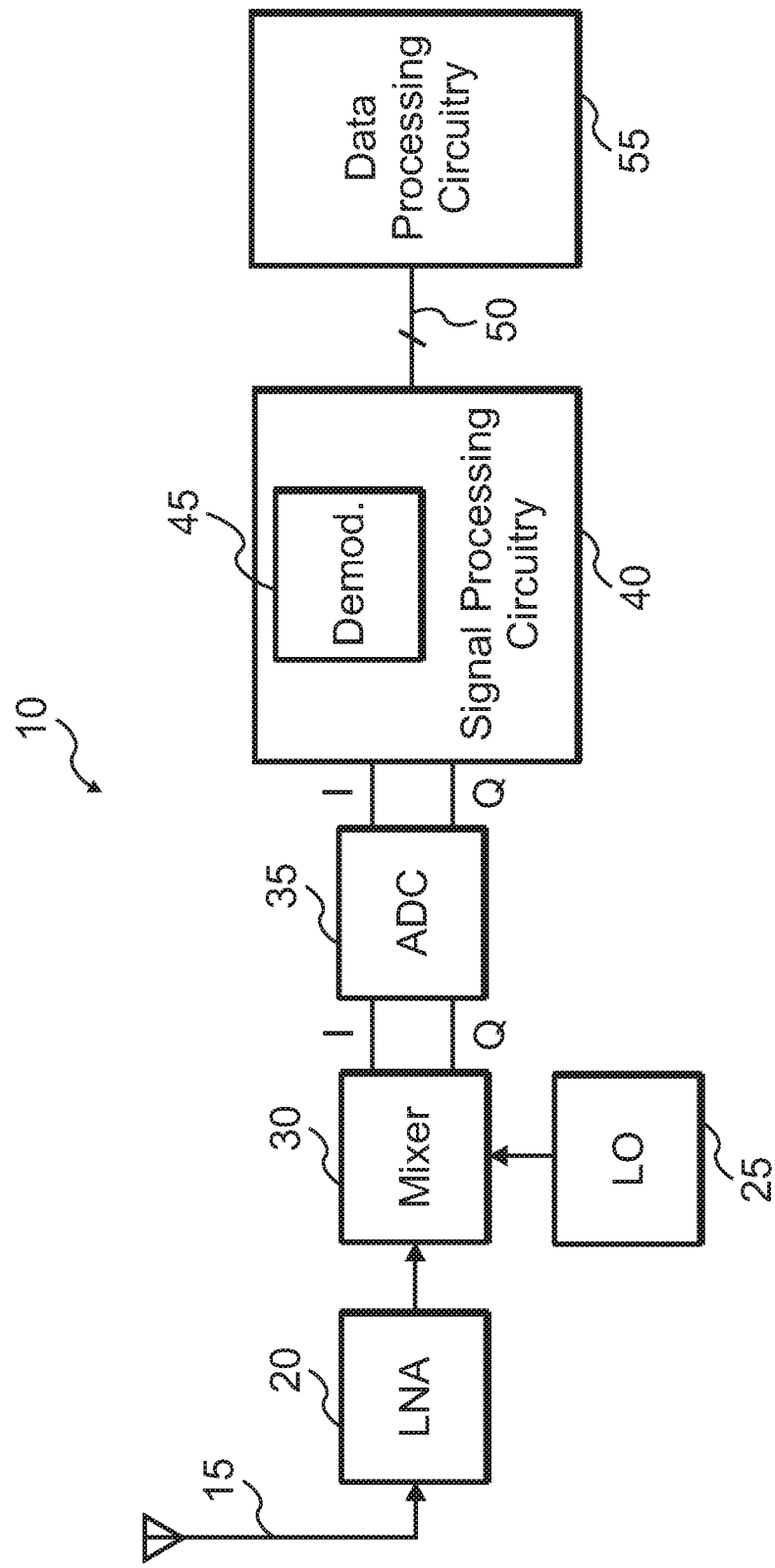
FIG. 1 shows a circuit arrangement for a receiver according to an exemplary embodiment.

FIG. 1 illustrates a circuit arrangement for a receiver 10 according to an exemplary embodiment. Receiver 10 receives RF signals via antenna 15. The RF signals feed an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) frequency provided by LO 25. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 converts the I and Q signals to digital I and Q signals. In exemplary embodiments, ADC 35 may use a variety of signal conversion techniques. For example, in some embodiments, ADC 35 may use delta-sigma (or sometimes called sigma-delta) analog to digital conversion.

ADC 35 provides the digital I and Q signals to signal processing circuitry 40. Generally speaking, signal processing circuitry 40 performs processing on the digital I and Q signals, for example, digital signal processing (DSP). In exemplary embodiments, signal processing circuitry 40 includes demodulator 45. Demodulator 45, described below in detail, performs demodulation of the digital I and Q signals to retrieve or extract information, such as data signals, that were modulated (e.g., in a transmitter (not shown)), and provided to antenna 15 as RF signals.

Signal processing circuitry 40 provides information, such as the demodulated data, to data processing circuitry 55 via link 50. Data processing circuitry 55 may perform a variety of functions (e.g., logic, arithmetic, etc.). For example, data processing circuitry 55 may use the demodulated data in a program, routine, or algorithm (whether in software, firmware, hardware, or a combination) to perform desired control or data processing tasks.

In some embodiments, data processing circuitry 55 may perform control of other circuitry, sub-system, or systems (not shown). In some embodiments, data processing circuitry 55 may provide the data (after processing, as desired, for example, filtering) to another circuit (not shown), such as a transducer, display, etc.

In exemplary embodiments, link 50 may take a variety of forms. For example, in some embodiments, link 50 may constitute a number of conductors or coupling mechanisms, such as wires, cables, printed circuit board (PCB) traces, etc. Through link 50, signal processing circuitry 40 and data processing circuitry 55 may exchange information, such as the demodulated data, control information or signals, status signals, etc., as desired.

Figure 2:
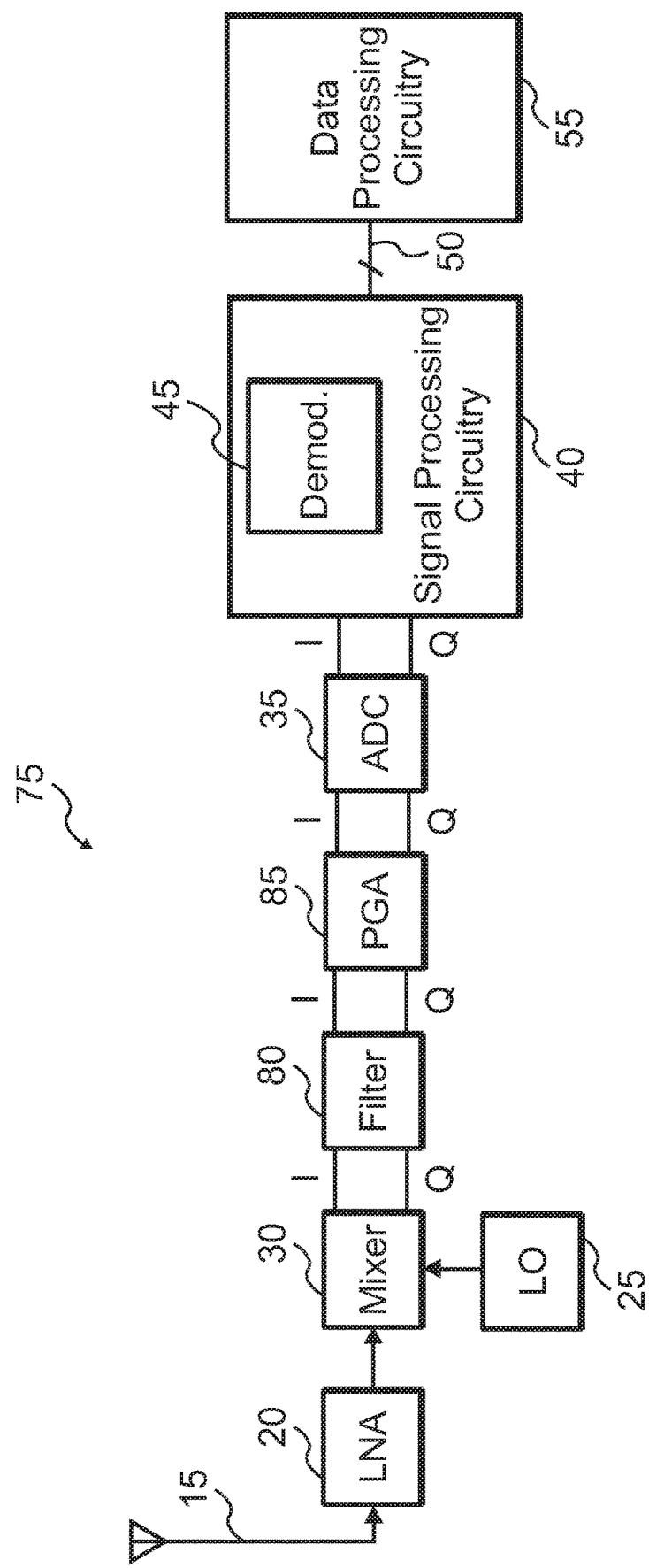
FIG. 2 shows a circuit arrangement for a receiver according to an exemplary embodiment.

FIG. 2 depicts a circuit arrangement for a receiver 75 according to an exemplary embodiment. Receiver 75 generally has a similar architecture as does receiver 10 (see FIG. 1). Referring again to FIG. 2, receiver 75 includes a filter 80 and a programmable gain amplifier (PGA) 85. Filter 80 provides filtering of the RF or baseband signal at the output of mixer 30. PGA 85 provides programmable gain for the filtered signal at the output of filter 80.

In some embodiments, PGA 85 has a gain that is programmable for different input levels of the RF signals received by antenna 15. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Note that variations of receiver 75 are possible and contemplated in exemplary embodiments. For example, in some embodiments, receiver 75 may include filter 80, but not PGA 85. Conversely, as another example, in some embodiments, receiver 75 may include PGA 85, but not filter 80. Other possibilities exist, for example, including one or more filters between antenna 15 and LNA 20 to facilitate accommodating several RF signal bands, etc.

Figure 3:
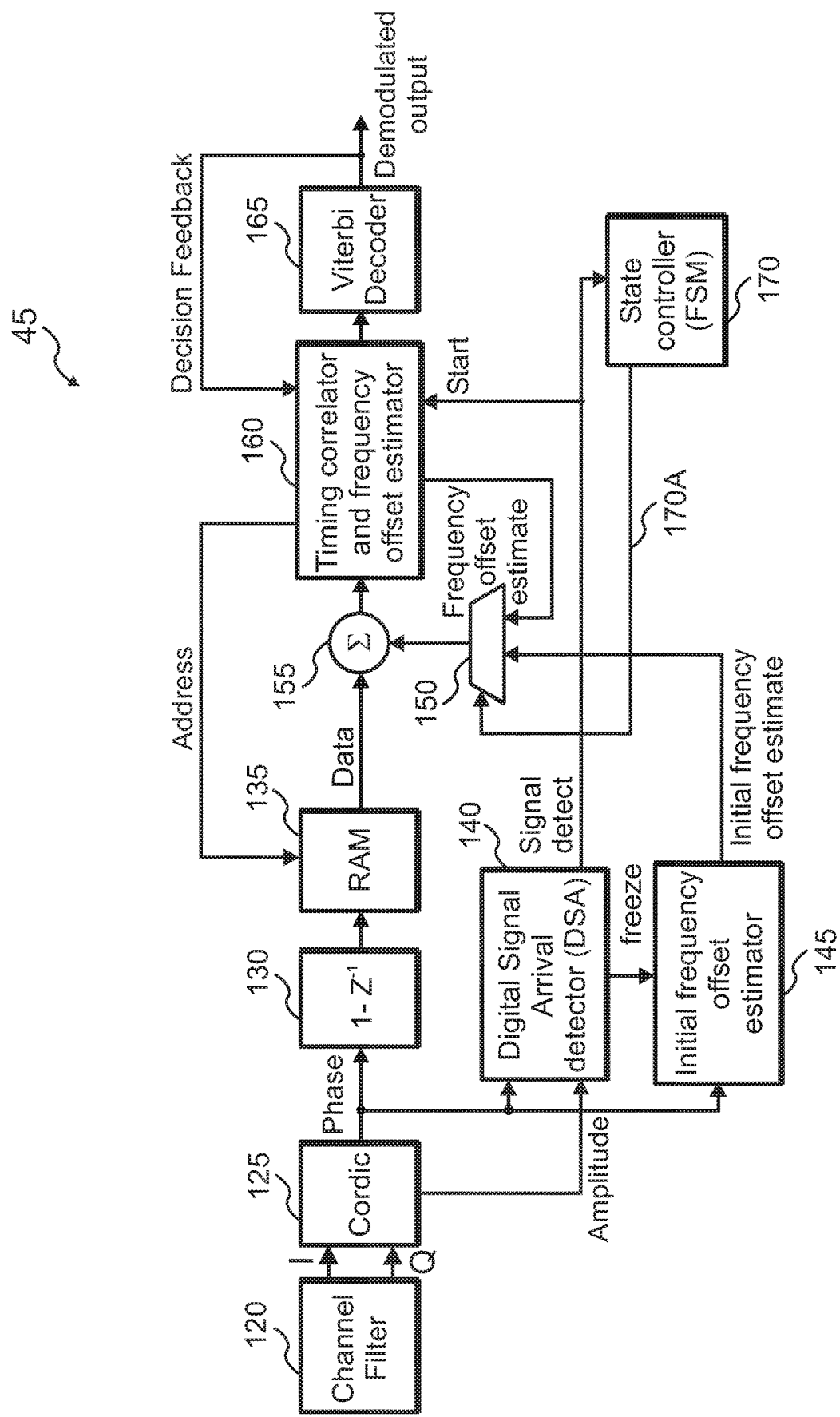
FIG. 3 shows a circuit arrangement for signal demodulation according to an exemplary embodiment.

As noted above, according to one aspect of the disclosure, receivers according to exemplary embodiments use a CPM demodulator that provides multi-bit observation intervals. FIG. 3 depicts a circuit arrangement for a CPM demodulator according to an exemplary embodiment.

The circuit arrangement in FIG. 3 includes an optional channel filter 120. If used, channel filter 120 digitally filters (e.g., low-pass filtering) of an input signal, for example, the I and Q signal from ADC 35 (see FIGS. 1, 2). Referring again to FIG. 3, channel filter 120 provides filtered signals I and Q to Cordic (or Cordic circuit) 125. Compared to the data rate (I and Q signals), Cordic 125 is overclocked in order to cause oversampling of the data signals.

The input I and Q signals to Cordic 125 are time-domain signals. Cordic 125 coverts the time-domain signals to polar (i.e., phase and amplitude) provided as two respective outputs. More specifically, the phase output of Cordic 125 is provided to phase differentiator 130, whereas both the phase and the amplitude outputs are provided to digital signal arrival (DSA) 140. The phase output of Cordic 125 is also provided to initial frequency offset estimator 145.

Phase differentiator 130, having a representative transfer function $1-z^{-1}$, performs phase differentiation of the signal at the phase output of Cordic 125. Phase differentiator 130 provides the differentiated output signal to memory 135 (a random access memory (RAM) in the embodiment shown). Note that in exemplary embodiments phase differentiator 130 operates over symbol intervals at an oversampled rate, not the data rate.

In response to the phase and amplitude signals from Cordic 125, DSA 140 detects or attempts to detect arrival of a data signal. When a signal is detected, DSA 140 provides via an output a "signal detect" signal to timing correlator and frequency offset estimator 160 and to state controller or finite state machine (FSM) (or controller, generally) 170. State controller 170 controls various operations of CPM demodulator 45. State controller 170 may receive and use configuration settings (e.g., via one or more configuration registers (not shown) from a host or other device (not shown)), and use those settings to control the operations of CPM demodulator 45. In exemplary embodiments, state controller 170 may be implemented as a finite-state machine (FSM), as desired. Other implementations of state controller 170 are also contemplated and possible. Examples include general logic circuitry, processors, custom logic, etc.

The "signal detect" signal also serves as a start signal for timing correlator and as a freeze signal to freeze the output of frequency offset estimator 160. Thus, until DSA 140 provides an indication of a signal arrival or detection, the timing correlator in timing correlator and frequency offset estimator 160 and Viterbi decoder 165 are not running. As a result, the power consumption of CPM demodulator 45 and, consequently, of the RF receiver, is reduced. The reduced power consumption may provide longer battery life in mobile applications or reduce the operating costs of the receiver overall.

In some embodiments, DSA 140 examines the eye opening of the input signal to determine whether the input signal constitute a valid signal. In some embodiments, DSA 140 examines or looks for phase spikes (in the phase signal received from Cordic 125). Presence of phase spikes would indicate that a valid signal has not arrived. In some embodiments, DSA 140 examines figures of merit, such as receiver signal strength indication or indicator (RSSI). A combination of the foregoing techniques may be used to perform signal arrival detection, as desired.

Initial frequency offset estimator 145 provides an initial frequency offset estimate to multiplexer (MUX) 150. The frequency offset occurs because the transmitter (not shown) typically uses an oscillator (e.g., crystal oscillator) whose frequency is not exactly at the center frequency of the channel. Initial frequency offset estimator 145 provides an estimated frequency correction to correct the offset. Initial frequency offset estimator 145 typically detects the average frequency offset by differentiating the phase signal provided by Cordic 125. For example, averaging may be obtained by differentiating subsequent samples and accumulating the differentiated values for two or four symbols long. When the freeze signal is asserted, the last completed accumulation is presented at the output of the initial frequency offset estimator. Initial frequency offset estimator may be implemented in a variety of ways, as persons of ordinary skill in the art will understand. The choice of implementation depends on factors such as design and performance specifications, general receiver architecture, receiver cost, complexity, size, system specifications, and the like, as persons of ordinary skill in the art will understand.

Initial frequency offset estimator 145 operates in response to a "freeze" signal from DSA 140. The "freeze" signal instructs the initial frequency offset estimator 145 to stop examining the phase signal from Cordic 125 and to provide a frequency offset initial estimate to adder 155.

Adder 155 receives another input from timing correlator and frequency offset estimator 160. Specifically, timing correlator and frequency offset estimator 160 provides a frequency offset estimate signal to adder 150. The initial frequency offset estimation is frozen when DSA 140 indicates that a signal has been detected (via the "signal detect" signal) and, subsequently, the initial frequency offset estimate (from initial frequency offset estimator 145) is used by the correlator in timing correlator and frequency offset estimator 160 to obtain the initial symbol timing and frequency offset estimate.

Data from RAM 135 drives another input of adder 155. The data are provided in response to address signals provided to RAM 135 from timing correlator and frequency offset estimator 160. RAM 135 receives and stores samples from phase differentiator 130. Because the derivative of phase constitutes frequency, the output of phase differentiator 130 includes frequency data. Thus, the samples stored in RAM 135 represent frequency information. RAM 135 contains over sampled data (differentiated phase over symbol interval at the oversampling rate). After signal arrival is detected (as indicated by DSA 140), the correlator in timing correlator and frequency offset estimator 160 is used to find a minimum cost function.

After DSA 140 detects a signal arrival, frequency information from RAM 135 is added to the frequency offset estimate to provide corrected frequency information to timing correlator and frequency offset estimator 160 and Viterbi decoder 165. DSA 140 might trigger somewhat earlier or later than nominal (for example, because of trigger jitter). An exhaustive search extends the search window to include the expected or worst case trigger jitter. More specifically, timing correlator and frequency offset estimator 160 runs an exhaustive search using the timing correlator functionality by examining all possible combinations of the data in RAM 135 to find a lowest cost function in order to determine the symbol boundaries. The exhaustive search runs through all sample intervals to determine a maximum likelihood of the start of the SYNC word (the SYNC word typically follows after the preamble, and indicates the start of data). Alternatively, the exhaustive search may be replaced by another search technique, process, algorithm, etc., for example, applying a fixed or dynamic threshold for comparison with the cost function.

In some embodiments, RAM 135 is organized as a circular buffer, and constantly receives and stores samples from phase differentiator 130. Other implementations might be used, depending on factors such as design and performance specifications, general receiver architecture, system specifications, and the like, as persons of ordinary skill in the art will understand.

Timing correlator and frequency offset estimator 160 is a block that provides several different functionalities. First, timing correlator and frequency offset estimator 160 detects timing boundaries of symbols. When symbol boundaries are known, controller 170 selects data symbols in RAM 135 and feeds those data symbols, after compensated for frequency errors to Viterbi decoder 165. Timing correlator and frequency offset estimator 160 also tracks frequency and timing error and, if appropriate or desired, changes the frequency offset estimate to correct the frequency offset.

Viterbi decoder 165 decodes the bitstream in the signal received from adder 155 to demodulate the received signal. At its input, Viterbi decoder 165 receives "soft code," i.e., symbols provided to Viterbi decoder 165 are not necessarily binary 0 or binary 1 (e.g., if 0 is represented by 10 and 1 is represented by −10, the signals provided to Viterbi decoder 165 might be 9, 11, −12, etc.). Viterbi decoder 165 uses information on multiple bits to make decisions regarding one bit of data, i.e., to determine whether a given bit is binary 0 or binary 1. Put another way, Viterbi decoder 165 is fed with different "soft" symbols and makes decisions based on symbols that arrive first and later (the value of the first symbol is decoded based on the first "soft" symbol and several "soft" symbols arriving later). Viterbi decoder 165 is populated or fed with soft symbols from phase differentiator 130. When one symbol is decoded, an additional "soft" symbol is shifted in, and a second symbol is decoded or detected based on a number of subsequent "soft" symbols, for example, four "soft" symbols.

Viterbi decoder 165 provides at its output demodulated data or signals. The output signal of Viterbi decoder 165 is fed back to timing correlator and frequency offset estimator 160 as a "decision feedback" signal. That signal allows timing correlator and frequency offset estimator 160 to adapt to the content of a frame of data. More specifically, the "decision feedback" signal is used to run timing correlator and frequency offset estimator 160 to perform a timing tracking operation or a frequency offset estimate operation. The operations compensate for timing and frequency drift, as typically happens over time. In exemplary embodiments, Viterbi decoder 165 may be replaced with any other decoder that performs MLSE. An example of another MLSE algorithm is published by Schalkwijk, Vinck and Post, "Syndrome decoding of binary rate kin convolutional codes," IEEE Transactions on Information Theory (1978).

In some embodiments, Viterbi decoder 165 may apply other schemes, for example, where a symbol has four different values. Generally, Viterbi decoder 165 may be implemented in various embodiments to accommodate m-ary modulation, as desired.

As noted, the timing correlator and frequency offset estimator 160 is disabled until a signal arrival is detected. Given that the power consumption of DSA 140 is lower than the correlator, less power is dissipated. Given that relatively large amounts of power are typically consumed in preamble search mode in a receiver, use of DSA 140 in the manner described provides reduction of the overall power consumption of the receiver.

Thus, to summarize, the circuit arrangement in FIG. 3, for example, Cordic 125 and phase differentiator 130, may be used to build a receiver with multi-bit observation interval. The timing correlator is started using a signal detect indication from DSA 140 and an initial frequency offset estimate from controller 170. Timing correlator and frequency offset estimator 160 serves as a multi-purpose correlator engine.

Figure 4:
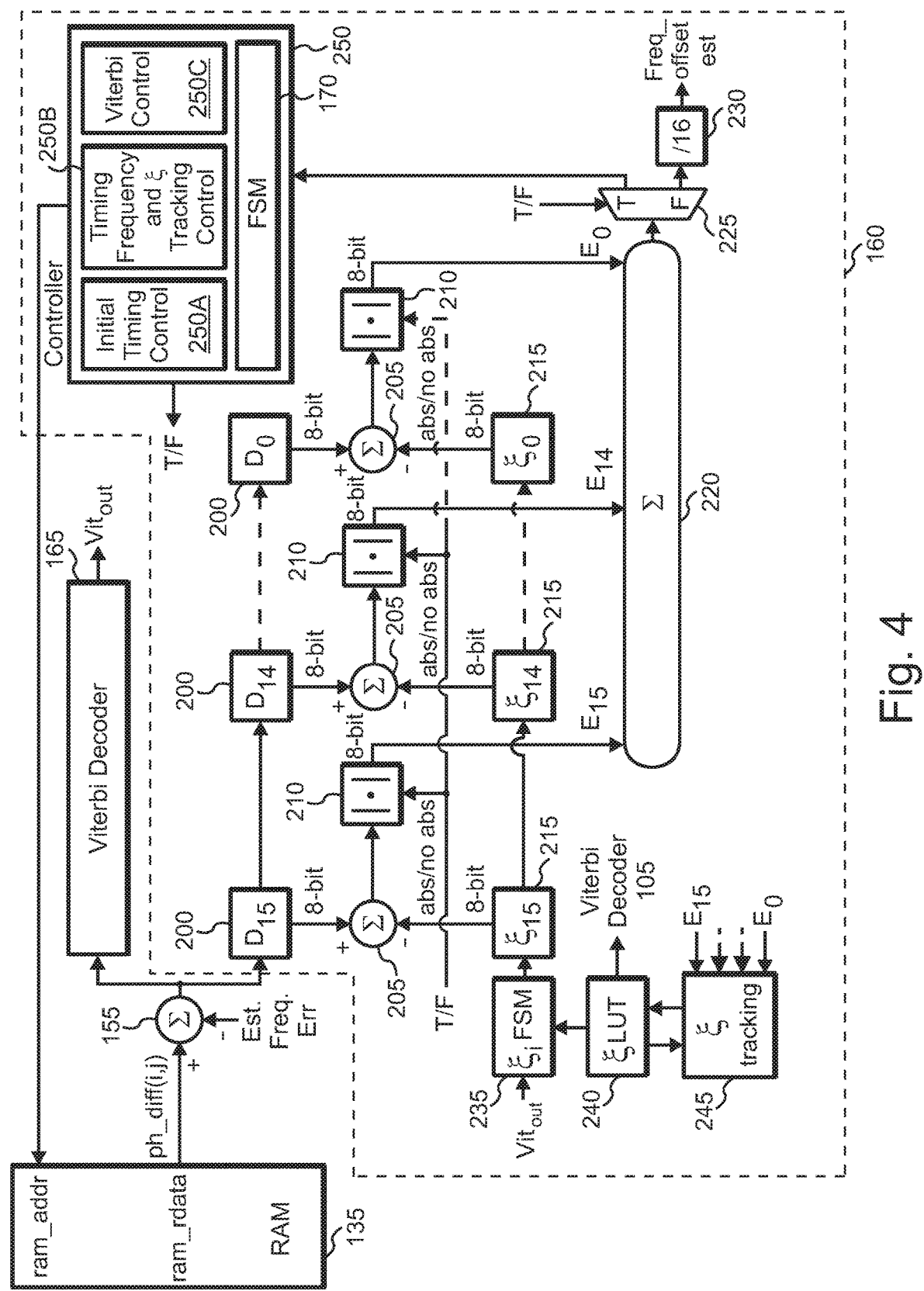
FIG. 4 shows a circuit arrangement for a timing correlator and frequency offset estimator according to an exemplary embodiment.

More specifically, timing correlator and frequency offset estimator 160 performs the following functions: (a) initial timing detection (finding the symbol boundaries) or estimation (exhaustive search); (b) second frequency offset estimation (the first estimation is performed by initial frequency offset estimator 145); (c) timing tracking (to compensate for changes, over time, in symbol boundaries); and (d) frequency offset tracking (to compensate for changes over time in the frequency offset). Using one block or subsystem reduces the number of circuit elements, such as gates, to provide the above functionality, which in turn results in reduced semiconductor die area and, hence, cost. FIG. 4 illustrates a circuit arrangement for a timing correlator and frequency offset estimator 160 according to an exemplary embodiment. Note that FIG. 4 also includes RAM 135, adder 155, and Viterbi decoder 165 to facilitate presentation.

A controller 250 controls the overall functionality of the circuitry shown in FIG. 4. Controller 250A includes FSM 170, described above, which controls the various functions of controller 250. Initial timing control 250A controls the initial timing function or detection of timing correlator and frequency offset estimator 160. Viterbi control 250C controls the operation of Viterbi decoder 165. Timing, frequency, and coefficient ($\xi$) tracking control controls the timing tracking, frequency offset tracking, and coefficient tracking functionality of timing correlator and frequency offset estimator 160.

Timing correlator and frequency offset estimator 160 includes a set of registers labeled $D_1$-$D_{15}$ (i.e., 16 bits, in the exemplary embodiment shown) coupled to form shift register 200. The first register in shift register 200 receives its input from the output of adder 155. The output of each register in shift register 200 feeds an input of a corresponding subtractor 205. A second input of each corresponding subtractor 205 is fed by the respective outputs of a set of corresponding coefficient registers 215. Coefficient registers 215 include coefficients, denoted as $\xi$, that are derived from the data preamble and SYNC word. For example, in the embodiment shown, the coefficients ($\xi_0$-$\xi_{15}$) include 6 bits derived from the preamble, and 10 bits from the SYNC word. Other configurations, including number of bits, for the coefficients are contemplated and may be used, as desired.

Subtractors 205 compare the actual values (from shift register 200, whose outputs are derived from frequency compensated data in RAM 135) and the expected values (from coefficient registers 215) of the data sequence. The outputs of subtractors 205 feed absolute value circuits 210. Under the control of the T/F signal (described below), each of absolute value circuits 210 conditionally (depending on the value of the T/F signal) generates at its output the absolute value of its input signal. The outputs of absolute value circuits are labeled as error signals $E_0$-$E_{15}$ in FIG. 4. The operation of absolute value circuits 210 depends on the value of the T/F signal. When timing correlator and frequency offset estimator 160 operates in the frequency offset estimation or tracking modes, the T/F function has a logic low value, which causes absolute value circuits 210 to bypass their respective absolute value function (i.e., the output value of the input to a respective absolute value circuit 210 has the same sign as its input value).

Conversely, when timing correlator and frequency offset estimator 160 operates in the initial timing detection or timing tracking modes, the T/F function has a logic high value, which causes absolute value circuits 210 to use an absolute value function (i.e., the output value of a respective absolute value circuit 210 has the sign bit removed). Controller 150 provides the T/F signal to absolute value circuits 210 and also to demultiplexer (DeMUX) 225.

Error signals ($E_0$-$E_{15}$) at the outputs of absolute value circuits 210 are added together by adder 220 to generate a sum of error signals, which is provided as the input of DeMUX 225. During the frequency offset estimation or tracking modes, divider 230 divides by 16 the sum of the error signals (i.e., generates an average error signal or value), and provides the result as the frequency offset estimate of timing correlator and frequency offset estimator 160. Conversely, during the initial timing detection or timing tracking modes of timing correlator and frequency offset estimator 160, the sum of the error signals is provided to controller 250, and is used to generate addresses used to retrieve data from RAM 135.

Referring again to FIG. 4, error signals ($E_0$-$E_{15}$) are also provided to coefficient tracking circuit 245, which operates in conjunction with coefficient lookup table (LUT) 240 and coefficient FSM 235. Error signals ($E_0$-$E_{15}$) are used to obtain coefficients from coefficient LUT 240, and are provided to Viterbi decoder 165. Coefficient FSM 235 receives the coefficient values from coefficient LUT 240, and also receives the output (demodulated signal) of Viterbi decoder 165. Coefficient FSM updates the coefficient values once it has information (from Viterbi decoder 165) about the received frame of data, such as its contents, what the frame of data looks like, etc. Thus, because of the feedback from the Viterbi decoder 165 output to coefficient FSM 235, the coefficient values are overall determined or updated or adjusted by the output signal of Viterbi decoder 165. In this arrangement the coefficients in both the Viterbi and cost function engine can be adapted to non-deterministic variations, such as filtering over the air (usually induced by multipath propagation), and imperfections in the modulation of the transmitter. The coefficient tracking circuit updates the coefficients in the coefficient LUT 240 using the errors signals ($E_0$-$E_{15}$). For example a relatively small part of the error is added to the associated coefficient. In this way, averaging is obtained when multiple correction cycles are used, which helps to suppress noise on the coefficients in the coefficient LUT 240.

As noted, during the initial timing detection or timing tracking modes of timing correlator and frequency offset estimator 160, the sum of the error signals is provided to controller 250. Controller 250 determines the lowest or the minimum of the set of cost functions (C(0) through C(6), assuming an oversampling ratio of 7), j, such that j=min[C(0), C(1), . . . , C(6)], where "min" represents the minimum function. The set of cost functions may be expanded to accommodate the trigger jitter from DSA 140, discussed above. The cost functions results from the shifting of more data through shift register 200, and is similar to the cost function used in the Viterbi technique. The value j is used to map addresses to retrieve data from RAM 135 to conduct an exhaustive search, as described above.

Figure 5:
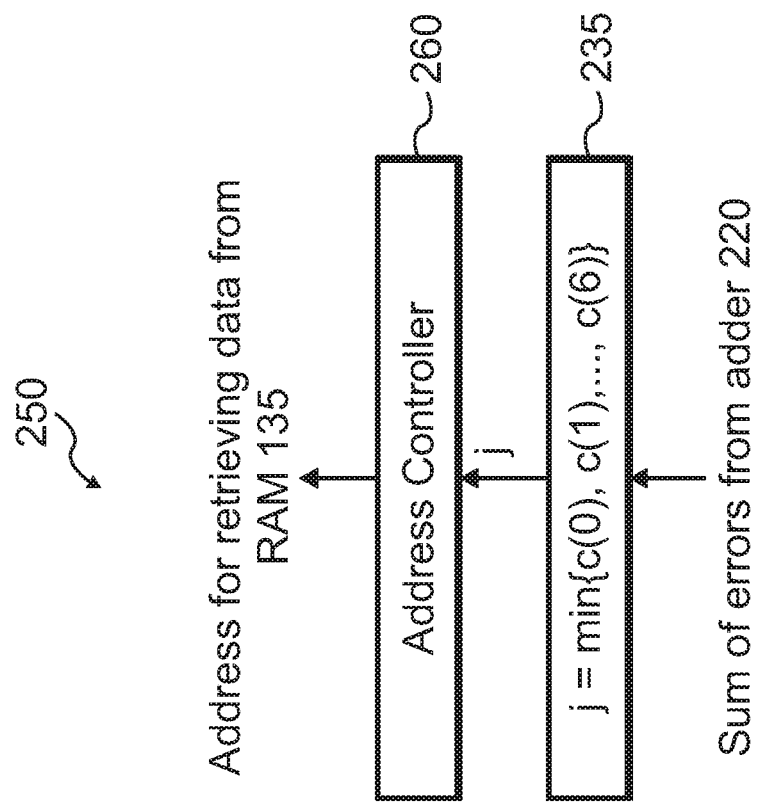
FIG. 5 shows a partial block diagram of a controller according to an exemplary embodiment.

FIG. 5 depicts a circuit arrangement for a part of controller 250 according to an exemplary embodiment to implement this functionality. Using the sum of the error signals, minimum cost calculator circuit 255 determines the value j as the minimum of cost functions. Address controller 260 uses the value j to determine or map addresses used to retrieve data from RAM 135.

The timing correlator and frequency offset estimate outputs of timing correlator and frequency offset estimator 160 are provided as:

$$\text{Timing\_corr} = \sum_{i=0}^{15} |D_i - \xi_i| \text{ and}$$

$$\text{Freq\_offset\_est} = \frac{1}{16} \sum_{i=0}^{15} (D_i - \xi_i),$$

where $D_i$ and $\xi_i$ represent, respectively, the output of the i-th register in shift register 200 (data from RAM 135, as frequency compensated), and the i-th coefficient ($\xi$).

Another aspect of the disclosure relates to concurrent timing recovery and frequency offset estimation/compensation, i.e., measuring the frequency offset, compensating the frequency offset, and extract timing (detect the synch word) using the same set of signal samples in the RF receiver. Concurrent in this context refers to the following three functions are performed on the same set of samples in the RF receiver: (1) frequency offset estimation, (2) frequency offset compensation, and (3) timing extraction (or timing detection or timing recovery or detecting the synch word). Timing extraction refers to the symbol positions being determined so that the received signal can be demodulated. For example, after timing extraction, referring to FIG. 3, addresses in RAM 135 are selected that correspond symbols that require demodulation. Demodulation may involve providing these symbols to the Viterbi decoder or to a data slicer circuitry (not shows). Timing extraction is also called timing recovery or initial symbol timing recovery. The sync word detection is typically a two-step process: in the first step the timing correlator determines a correlation with the sync word or part of the sync word. The second step starts when the correlation is found. Sync word symbols are read out of RAM 135 and provided to a detector such as the Viterbi decoder. The Viterbi decoder produces a bit stream and a sync word detector (not shown) can be used to correlate this bit stream with the expected sync word. When there is a match the receiver may declare "sync word detected." (In demodulation schemes such as shown in FIG. 3, frequency offset estimation is performed during the preamble and frequency compensation is performed on each sample just before the compensated values are fed to the cost function circuitry in timing correlator and frequency offset estimator 160. Frequency offset estimation is performed over a different set of samples compared to the timing detection functionality.) The three foregoing steps in exemplary embodiments are performed in real-time, i.e., in this context, the steps are performed within a sample period. As a result, the latency in timing detection in the RF receiver is reduced. Relatively low latency provides timing benefits for turn-around timing, antenna diversity, and duty-cycling the RF receive circuitry for reduced power consumption (i.e., not run the circuitry continuously).

Thus, RF circuitry, such as RF receivers, according to exemplary embodiments measure the frequency offset, compensate the frequency offset, and extract timing using the same set of signal samples in the receiver, e.g., the set of samples stored in RAM 135 (see FIGS. 4-5, described above) or provided directly (without using a memory such as RAM 135). Such receivers also provide improvements in: (a) accuracy of frequency offset measurements by using all the symbols in the detection window to calculate the frequency offset, (b) sync word detection reliability even for sync words with poor auto correlation properties, (c) reducing the dependency on the preamble, obtaining reliable sync word detection even when preceding preambles are relatively short, and (d) reducing turnaround latency and/or jitter, and (e) reducing power consumption while in search mode. In RF receivers according to various embodiments, timing recovery is improved, thus reducing or overcoming packet error rate (PER) floors (even with comfortable or relatively high signal levels), and improving receive sensitivity. The aforementioned detection reliability can be contributed, in part, to the instantaneous frequency offset feedback, which is accurate when the correct sync word is received, e.g., when an incorrect sync word is received, for example, in the presence of noise, the frequency offset feedback will actually introduce a frequency error which will make it less likely that the sync word correlation will be successful.

Timing detection in wireless receivers usually uses a version of the received signal that is compensated for frequency offset before timing recovery function is performed (timing recovery generally refers to timing correlation functionality, for example, as described above in connection with FIGS. 3-5). The frequency offset is the offset between the transmitter's carrier signal and the receiver's tuning frequency. Conventionally, a technique used measures the frequency offset during the preamble, e.g., during a . . . 101010 . . . preamble the average frequency modulation over an even number of bits is zero, thus what remains is the frequency offset. This technique works relatively well when the preamble is long enough, and the window in which the frequency offset is measured is correctly aligned with received preamble. The alignment typically uses dedicated preamble detection circuitry, as persons of ordinary skill in the arts will understand. The detection capability of preamble detection circuits can be affected by co-channel interference or by long ramp-up times in the transmitter's power amplifier (PA) (in a transceiver setting), which can cause premature triggering. Hence, the search window could be placed outside or partially outside the preamble, which may cause errors in the frequency offset measurement. Relatively short preambles, such as used in Bluetooth Low Energy (BLE), which uses 8-bit preambles in 1 M mode, can exacerbate the problem. Automatic gain control (AGC) circuitry settling takes a finite amount of time, and will make the received preamble, which is used for the preamble detection and frequency offset measurement, even shorter. The error in frequency offset measurement may result in reduced receive sensitivity, or in even missed sync word detection (or access address detection in BLE). The latter affect may result in missed packets.

Furthermore, sync words in typical RF receivers may exhibit relatively poor autocorrelation properties, i.e., multiple peaks in the autocorrelation function. For example, the Access Address in BLE, used to synchronize the RF receiver, may be randomly chosen with a few restrictions, which could result in relatively poor autocorrelation properties. Conventional sync word detection methods may trigger on correlation side peaks, which may cause synchronization problems, and failure to properly receive the transmitted packets. For example, in some cases, the IQ-DSA (in-phase quadrature digital signal arrival detection circuitry) may be sensitive to, and trigger on, correlation side peaks.

Overcoming several of the above phenomena conventionally entails successful preamble detection. Use of physical layers (PHYs) with relatively short preambles, however, makes doing so relatively complicated and relatively prone to failure (e.g., in BLE 1 M-uncoded PHY, there are merely 8 preamble symbols available). After AGC settling, the remaining bits for preamble detection may be limited to 4 symbols. The preamble dependency therefore can cause complications when preambles are relatively short.

In the RF receivers described above (see FIGS. 3-5 and, generally, U.S. patent application Ser. No. 15/164,363, cited above), an exhaustive search finds the minimum cost function, associated to the sync word, using samples stored in RAM 135 (see FIGS. 3-5). The minimum cost function is considered to relate to the position of the sync word (or Access Address in BLE) in RAM 135. Synchronization is obtained by using the address pointer (which may be generated by a variety of means, as persons of ordinary skill in the art will understand, such as an address controller (not shown) in timing correlator and frequency offset estimator 160) for RAM 135 where minimum cost is detected as a reference to receive the remainder of the packet. Due to memory and speed constrains, the window (RAM space) in which the exhaustive search is performed is limited, e.g., typically not more than a 10-symbol margin may be used before and after the projected sync word position.

The exhaustive search, however, uses a start signal from a preamble detector such that the sync word is inside the search window. In the priority U.S. patent application Ser. No. 15/164,363, cited above, a phase based DSA is used to start the exhaustive search. The phase based DSA is configured to detect the preamble, after which an exhaustive search is started, using a cost function engine (CFE) (see FIG. 5). In other words, the sync word detection depends on correct preamble detection. The phase based DSA could trigger early or late, thus causing the sync word to be placed, partially or completely, outside the search window (e.g., when a slow PA ramping is used in the transmitter (in a transceiver embodiment), the DSA may trigger too early. Conversely, when the AGC circuitry takes a relatively long time to settle, the DSA may trigger too late. This scenario may lead to sync word detection failure and, hence, loss in packet receptions.

Furthermore, a delay exists in detecting the sync word or Access Address. For the most part, the delay is caused by performing the exhaustive search. Especially at high data rates and short payloads, the sync word may be detected relatively close to, or even after, the end of the packet. This scenario may complicate turnaround timing or timing related to Angle of Arrival/Departure (AoX), such as in BLE, e.g., to comply with the turn around timing specification, the position of the address pointer, where the sync word is detected, is used to calculate the timing to turnaround the transceiver from receive mode to transmit mode to send an acknowledgement to the sender of packet(s). In Angle of Arrival/Departure (AoX), the position of the address pointer, where the sync word is detected, is used to calculate the start of the supplemental and the timing of the antenna switch moments.

More complicated signal processing techniques might be used to detect a start signal for the exhaustive search (e.g., an IQ-based DSA (IQ-DSA) could be used to detect the sync word). Aside from the detection complications related to poor sync words, the IQ-based DSA has a relatively high power consumption. The total power consumption in some IoT applications may be dominated by the power consumption in the receiver's search mode, i.e., a mode where the receiver is waiting until a desired packet arrives. Clearly, relatively high power consumption, such as while in search mode, is undesirable.

RF receivers according to various embodiments address each of the points discussed above. They do so by reducing sensitivity to frequency offset, improving robustness when using sync words with bad auto-correlation properties, eliminating use of error prone preamble detection, reducing detection latency, simplifying accurate timing stamps for turnaround and AoX, lowering power consumption when in search mode while maintaining good receive sensitivity and relatively low PER floors.

RF receivers according to various embodiments provide the following improvements or advantages: improved or increased accuracy in frequency offset compensation (improving receive sensitivity and lowering the PER floor of the receiver), improved robustness against side peaks in the sync word's autocorrelation function (e.g., in BLE, where the Access Address can have side peaks in the autocorrelation function), improved or lowered detection latency, thus helping timing for turnaround and AoX. In addition, RF receivers according to various embodiments have no dependency on preamble detection. In this regard, preamble detectors can be unreliable, especially when the preamble is relatively short. For example, in BLE, merely 8 symbols are available in the preamble. Also, the lack of dependence or reliance on preamble detection allows the use of phase-based DSAs, which results in lower or improved power consumption while in search mode. Furthermore, early preamble detection by the phase-based DSA does not affect the sync word detection. By not relying on preamble detection in order to perform frequency offset compensation and timing recovery, RF receivers according to exemplary embodiments provide improved performance.

Figure 6:
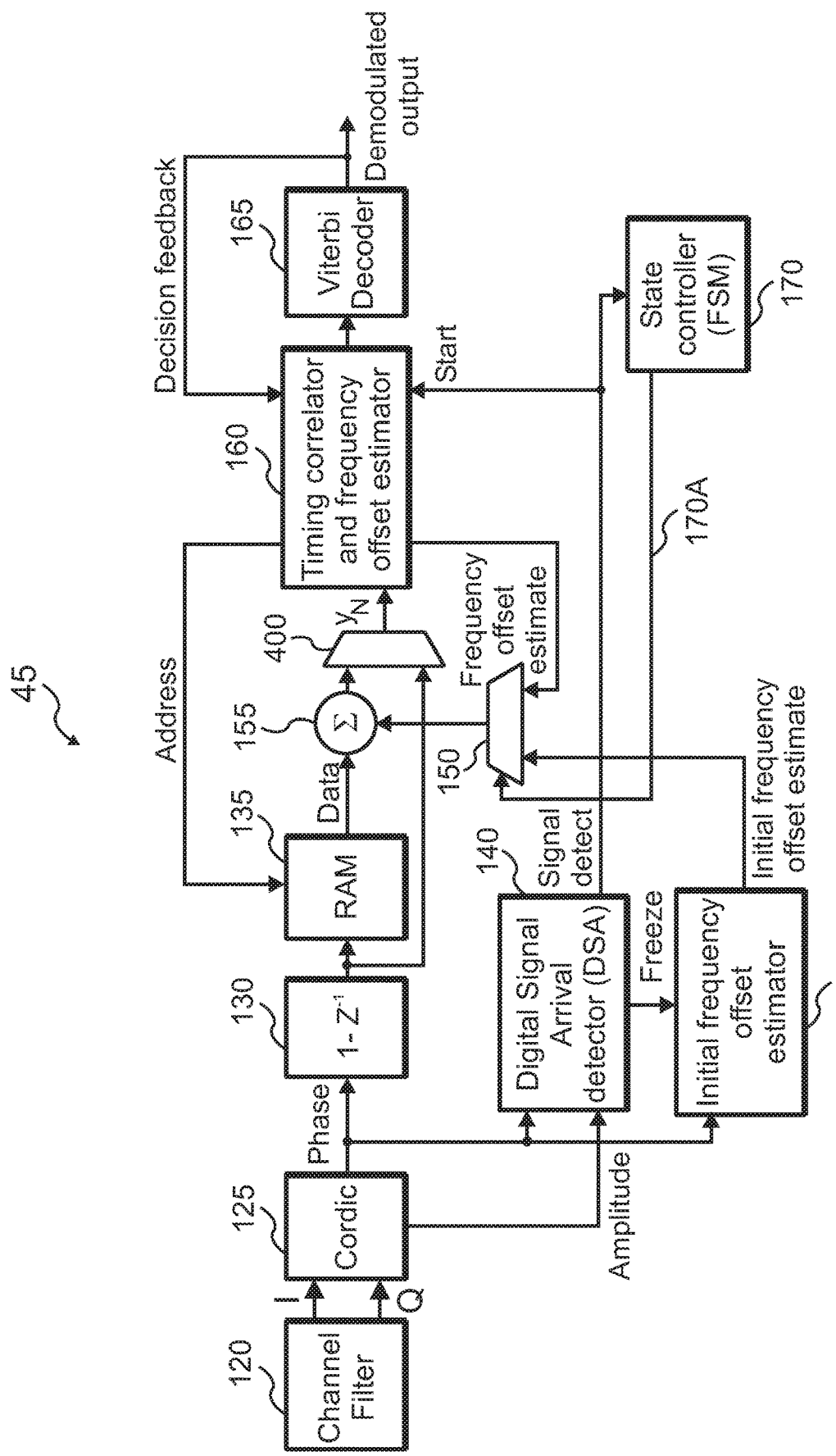
FIG. 6 shows a circuit arrangement for signal demodulation according to an exemplary embodiment.

FIG. 6 shows a circuit arrangement 45 for signal demodulation according to an exemplary embodiment. Circuit arrangement 45 is similar to the circuit arrangement in FIG. 3, but includes modifications to attain the characteristics described above (e.g., concurrent timing recovery and frequency offset estimation/compensation). Referring to FIG. 6, MUX 400 is added, and also timing correlator and frequency offset estimator 160 is modified, as described below. More specifically, MUX 400 is coupled to receive as inputs the output signal of adder 155 and the output signal of phase differentiator 130. The two inputs to MUX 400 correspond to the tracking mode and the acquisition mode of the RF receiver, respectively. In other words, the output signal of adder 155 is used as the input to MUX 400 that corresponds to the tracking mode, whereas the output signal of phase differentiator 130 is used as the input to MUX 400 that corresponds to the acquisition mode. In response to a control signal from state controller 170 (e.g., a select signal for MUX 400), MUX 400 selectively provides one of its input signals as output signal $y_N$ to timing correlator and frequency offset estimator 160.

Figure 7:
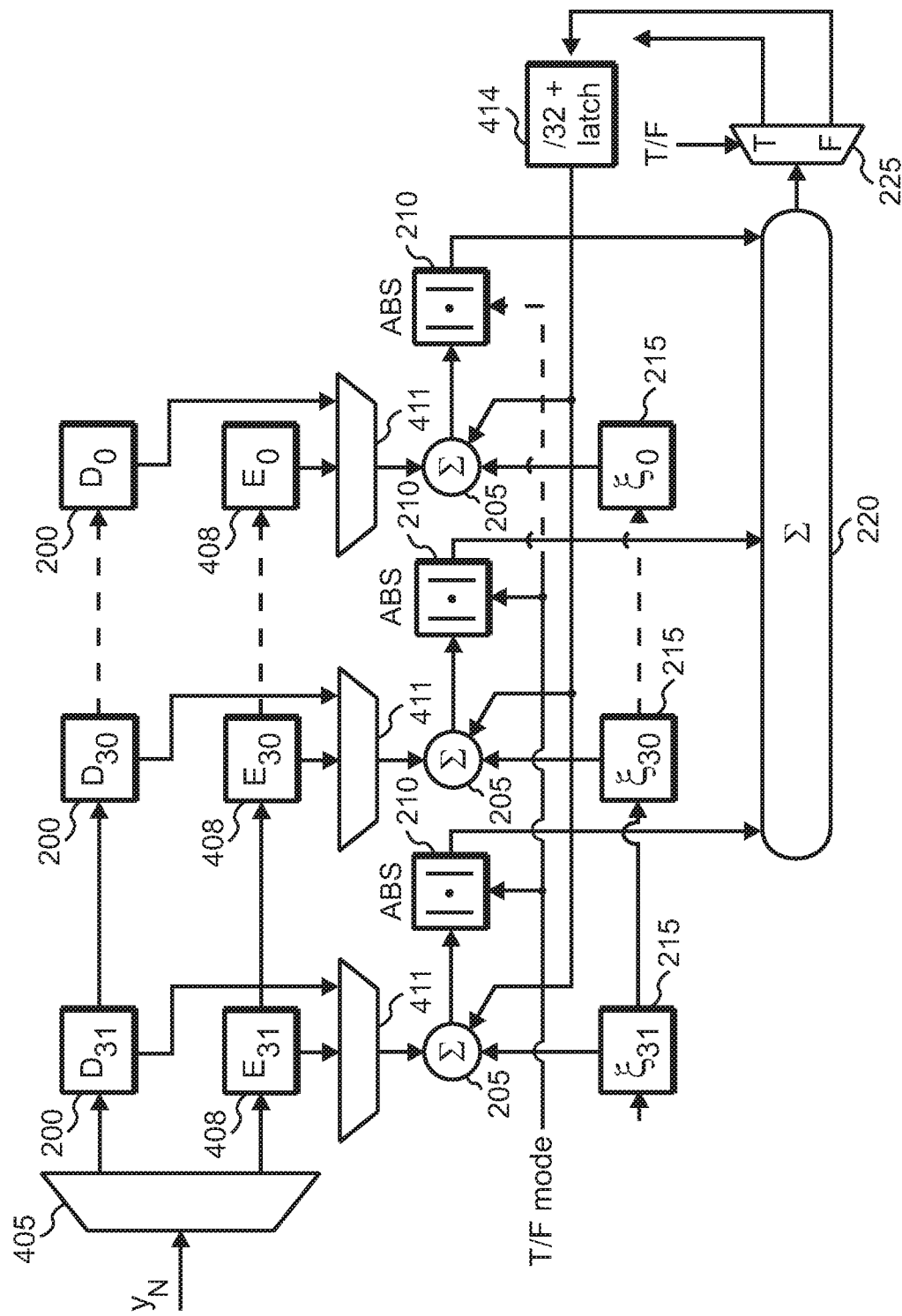
FIG. 7 illustrates a circuit arrangement for a cost function circuit according to an exemplary embodiment.

Also, as noted, timing correlator and frequency offset estimator 160 is modified so that it can run in "real time" (not running based on data provided by RAM 135), and furthermore compensate for frequency errors in real-time (as noted above, real-time in this context means performed within a sample period). The modified timing correlator and frequency offset estimator 160 allows for real-time detection of the sync word, which constitutes timing recovery. No preamble detection or signal arrival detection is needed to perform those functions. To facilitate description of the modifications, reference is made to FIG. 4, which in part shows timing correlator and frequency offset estimator 160. Instead of an exhaustive search triggered by signal arrival detection (as described above), the circuit arrangement of FIG. 6 may run the timing correlator and frequency estimator 160 continuously, processing the signal $y_N$ with MUX 400 controlled so as to output the signal of the phase differentiator 130 to find a minimum cost function. To do so, a cost function engine (CFE) or cost function circuit (CFC) is used. In the circuit in FIG. 4, the CFC includes shift register 200, subtractors 205, absolute value circuits 210, and coefficient registers 215. In exemplary embodiments, however, the CFC in timing correlator and frequency offset estimator 160 is modified so that it can run in real time. FIG. 7 shows the modified CFC. More specifically, a DeMUX 405, a shift register 408, which includes registers $E_0$-$E_{31}$, and a set of MUXs 411, and a divide-and-latch circuit 414 are added to the CFC, as FIG. 7 details. DeMUX 405 demultiplexes, in response to a control signal received, for example, from FSM 170 in FIG. 6), multiplexed data received from MUX 400 (see FIG. 6).

Referring gain to FIG. 7, by virtue of using shift register 200 and shift register 408, every OSR (over-sampling rate) phase has its own delay chain. The control signal for DeMUX 405 is such that the signal $y_N$ is distributed among the shift registers in a cyclic fashion: sample $y_N$ is provided to shift register 200, sample $y_{N+i}$ is provided to shift register 408, sample $y_{N+2}$ is provided to shift register 200, and so on in alternating fashion. Note that FIG. 7 illustrates an OSR of 2 (and a 32-bit synch word), which is why two delay chains realized by shift registers 200 and 408 are shown. As persons of ordinary skill in the art will understand, other OSR values and/or synch word sizes may be used by using appropriate numbers of delay chains (e.g., shift registers). MUXs 411 receive the respective outputs of shift register 200 and shift register 408. In response to a control signal (e.g., as provided by FSM 170 in FIG. 6), MUXs 411 provide either the outputs of shift register 200 or the outputs of shift register 408 to subtractors 205. The control signal of MUX 411 is operated in synchronicity with the control signal of DeMUX 405 such that each new loaded sample can be directly evaluated by the CFC. For example, when a sample is provided to shift register D then MUX 411 will provide all shift register outputs of shift register D to all subtractors 205. The evaluation typically starts with a frequency offset estimation, i.e., T/F mode is set to F mode which will bypass the absolute value circuits 210. An accurate frequency offset estimation will be obtained at the output of the divide and latch function 414, when the frequency deviations as held in the evaluated shift register correlates with the programmed values. This frequency offset estimation value will be subtracted (compensated) in each subtractor stage 205, thus providing frequency compensation at each of the subtractor 205 outputs. On the same set of samples the T/F mode will be set to T mode which will enable absolute value circuits 210 so that a cost can be calculated. If timing is not recovered then a new sample will be provided to shift register E, and all of the above operations are repeated until timing is recovered. Note that the frequency estimation will not be accurate if the frequency deviations in the evaluated shift register does not correlate with the programmed values but, in that case, accurate compensation is not needed. Timing is recovered when the calculated cost at output T of DeMUX 225 is below a threshold and shows a local minimum. With this local minimum, the addresses of symbols in RAM 135 can be calculated, since the samples are provided synchronously to timing correlator and frequency offset estimator 160 and to the RAM 135 during the acquisition phase. Thus, for example, the values could be programmed according to the sync word pattern and associated frequency deviations. When timing is recovered the RAM address pointer can select all symbols related to the sync word (starting at the first) and can provide these symbols to the Viterbi decoder. A binary check can be performed on the output stream to qualify correct sync word detection. Also subsequent payload symbols can be demodulated in the same way. A more detailed description of the timing recovery is provided above. Note that the functionality of the circuitry in FIG. 7 may be implemented in different circuit arrangements, as desired. For example, if the circuit arrangement of FIG. 7 is not fast enough, i.e. there are not enough clock periods available to process the T and F modes within one sample period, then each shift register may have its dedicated subtractors 205, absolute value circuits 210, and adder 220. If the resulting speed gain is not enough, then T and F modes may each use their own dedicated hardware. When there are enough clock cycles available, then the functions performed by the circuit of FIG. 7 could be processed in a digital signal processor (DSP), a processor, microcontroller unit (MCU), and the like, as persons of ordinary skill in the art will understand.

Referring to FIG. 7, note that, in the acquisition phase, the CFC in FIG. 7 can process differentiated phases in real time (as provided by phase differentiator 130 in FIG. 6). Referring again to FIG. 7, in the tracking mode, the samples provided by RAM 135 samples can be used, similar to the disclosure in U.S. patent application Ser. No. 15/164,363, cited above. Note the use of the T/F (timing detection/frequency offset compensation) signal. In the timing detection mode, the T/F signal enables absolute value circuits 210, i.e., absolute value circuits 210 provide an absolute value of their input signals as their respective output signals. In the frequency offset compensation, however, the T/F signal bypasses (or disables the absolute-value functionality of) absolute value circuits 210, i.e., absolute value circuits 210 provide their input signals as their respective output signals.

Divide-and-latch circuit 414 divides the value provided by DeMUX 225 (frequency compensation data) by 32 (or other desired value in other embodiments, as persons of ordinary skill in the art will understand), and latches the resulting divided value, which constitutes the output of divide-and-latch circuit 414. The output of divide-and-latch circuit 414 constitutes frequency offset estimation data in the frequency offset compensation mode, and is provided an additional input to subtractors 205. The output of MUX 411 can be called $K_i$, the output of the subtractor can be called $L_i$, referring to FIG. 7, $K_0$ to $K_{31}$ and $L_0$ to $L_{31}$ and the output of divide-and-latch circuit 414 can be called F. The output of the subtractor is: $L_i=K_i-\xi_i-F$. It can be seen that the frequency offset is compensated by subtracting F from $K_i$. The error in the deviation is found by subtracting the expected deviation value from the frequency compensated $K_i$ (i.e., $K_i-F$). In F mode, the outputs of absolute value circuits 210 are bypassed so that $L_0$ to $L_{31}$ is added to find the frequency error. This frequency error is actually amplified by the number of stages i so that the divider is used to scale it back for proper frequency offset compensation in subtractors 205. In the T mode, absolute value circuits 210 are enabled so that $|L_0|$ to $|L_{31}|$ is added to find the total error or cost relative to the expected pattern as programmed in the $\xi$ values. The additional input facilitates the frequency offset compensation functionality in various embodiments, having the attributes described above. Note that the CFC is reused for estimating frequency offset and for timing and frequency drift tracking, which provides savings in hardware and, thus, cost, complexity, chip area, etc. Further note that in tracking mode, the frequency offset compensation is performed for early, late, and current phases individually using the $y_N$ signal stored in RAM 135. Although signal arrival detection is not needed or used in the embodiment of FIG. 6, the phase-based DSA can be used to start the timing recovery hardware, thus lowering power consumption in the receiver search mode. More generally, the CFC (FIG. 7) is used shared across multiple functions, i.e., initial Frequency offset compensation, initial Timing recovery, frequency drift tracking, and timing tracking. No additional circuitry is needed for preamble detection and frequency estimation as frequency offset measurement and compensation is performed concurrently with timing correlation inside timing correlator and frequency estimator 160. Furthermore, the frequency and timing tracking loop can be the same as (or similar to) described in U.S. patent application Ser. No. 15/164,363, cited above. With respect to the power consumption of the receiver, the timing recovery hardware in exemplary embodiments can be used continuously, until it detects the desired signal or the sync word is found. Power consumption of the receiver may be reduced by starting the timing recovery hardware if a signal arrival is detected (as indicated by the phase-based DSA). Furthermore, low power signal arrival detection techniques, such as those described in U.S. patent application Ser. No. 13/949,837 (phase-based DSA), cited above, may be used.

Note that for the signal arrival detector 140 power consumption is lower than the power consumption of timing recovery hardware, which allows for energy savings. More specifically, power consumption in some RF receivers, such as those used in IoT devices, is usually determined largely by the power consumption during the frame search mode, so the signal arrival detector can save relatively significant energy. In the phase-based DSAs described in U.S. patent application Ser. No. 15/164,363, cited above, the DSA might detect too early (PER floor when exhaustive search window does not contain the complete sync word). In exemplary embodiments according to the present application, early detection does not cause any detection problems because of real time operation of the timing recovery system. In exemplary embodiments, after starting, timing correlator and frequency offset estimator 160 runs continuously, i.e., it keeps running (without being reset) while it performs timing recovery operations.

Figure 8:
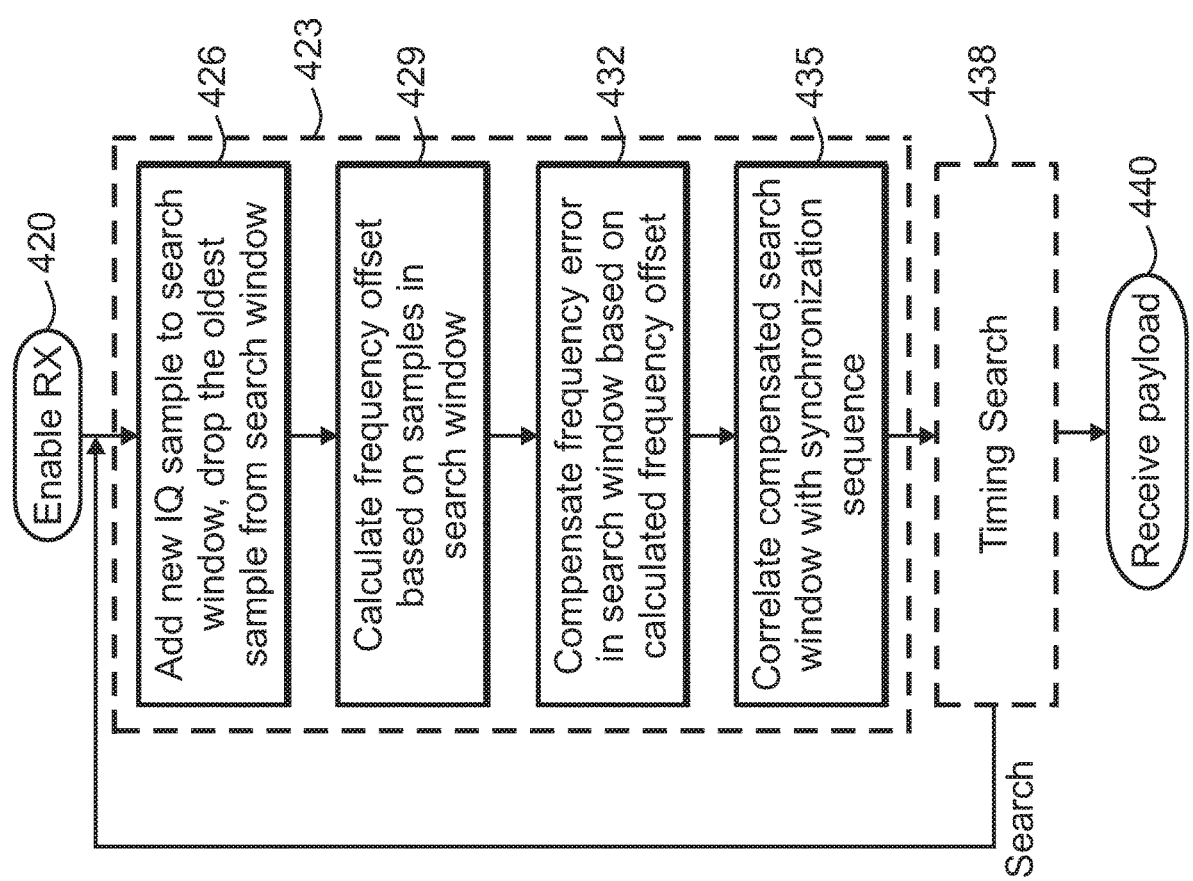
FIG. 8 shows a flow diagram for a process of receiving RF signals according to an exemplary embodiment.
Figure 9:
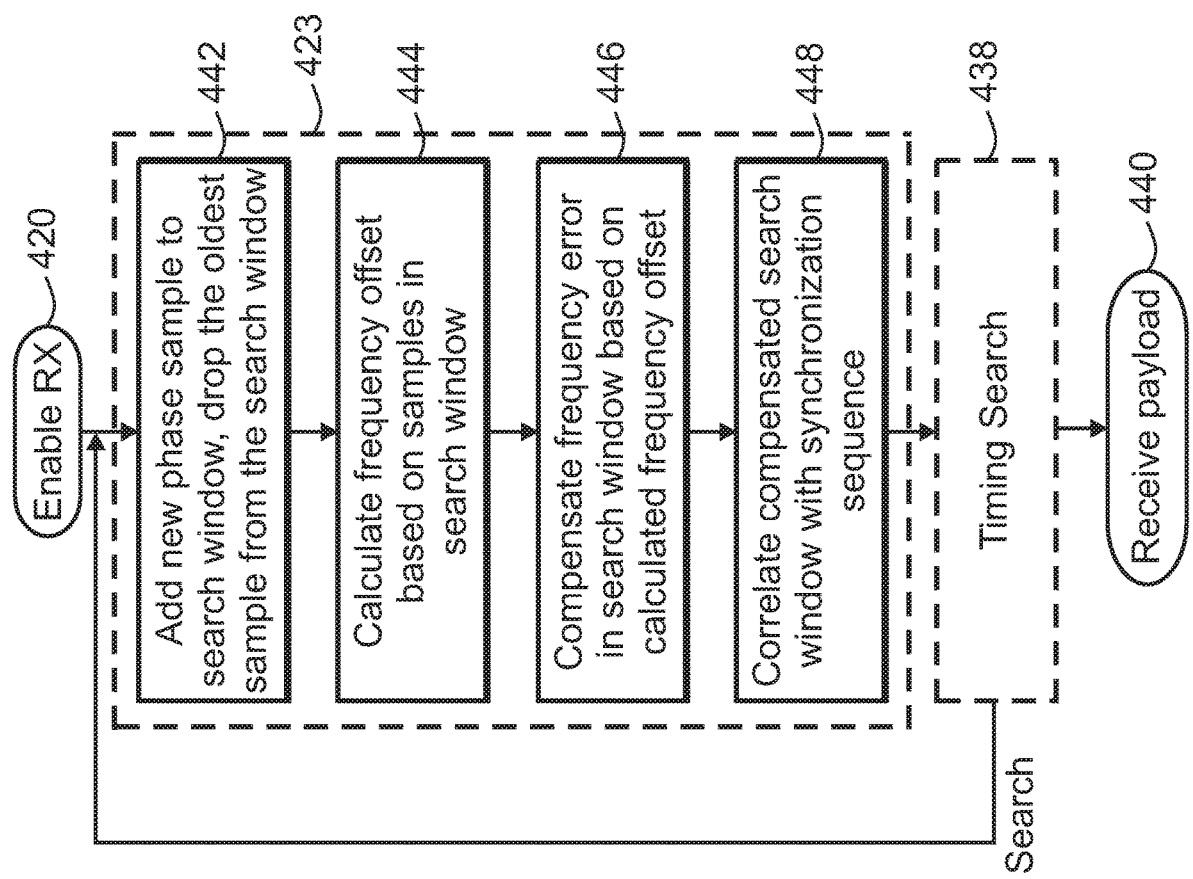
FIG. 9 shows a flow diagram for a process of receiving RF signals according to an exemplary embodiment.

FIGS. 8-14 provide process flow diagrams for various operations of RF receivers according to exemplary embodiments. FIG. 8 shows a flow diagram for a process of receiving RF signals according to an exemplary embodiment where timing recovery is obtained by correlating the received pattern with the expected sync word sequence. More specifically, the figure shows RF receiver operation using IQ samples. At 420, the receiver is enabled. At 423 (which includes 426, 429, 432, and 435), frequency offset compensation and sync word correlation are performed using the same set of samples. Specifically, at 426, a new IQ sample is added to the search window, and the oldest sample is dropped from the search window. At 429, frequency offset is calculated based on samples in the search window. At 432, frequency error or offset is compensated in the search window based on the calculated frequency offset, i.e., samples in the search window will be compensated for frequency error or offset. At 435, the frequency-offset-compensated search window is correlated with the expected synchronization sequence. At 438, a timing search is performed based on the correlation found at 435. Detailed examples of timing search algorithms are provided below. If the timing search does not succeed, control returns to 426. Otherwise, at 440 the payload is received based on the recovered timing. It is also possible to start receiving with the synchronization sequence based on the recovered timing. For example, the synchronization sequence may be coded, such as in the BLE coded PHY, and in that case a decoder may be used to receive the synchronization sequence. FIG. 9 shows a flow diagram for a process of receiving RF signals according to another exemplary embodiment, where timing recovery is obtained by correlating the received pattern with the expected sync word sequence. More specifically, the figure shows RF receiver operation using phase samples. At 420, the receiver is enabled. At 423 (which includes 442, 444, 446, and 448), frequency offset compensation and synch word correlation are performed using the same set of samples. Specifically, at 442, a new phase sample is added to the search window, and the oldest phase sample is dropped from the search window. At 444, frequency offset is calculated based on samples in the search window. At 446, frequency error or offset is compensated in the search window based on the calculated frequency offset, i.e., samples in the search window will be compensated for frequency error or offset. At 448, the frequency-offset-compensated search window with synchronization sequence is correlated. At 438, a timing search is performed based on the correlation found at 448. If the timing search does not succeed, control returns to 442. Otherwise, at 440 the payload is received based on the recovered timing. It is also possible to start receiving with the synchronization sequence based on the recovered timing. For example, the synchronization sequence may be coded, such as in the BLE coded PHY, and in that case a decoder may be used to receive the synchronization sequence.

Figure 10:
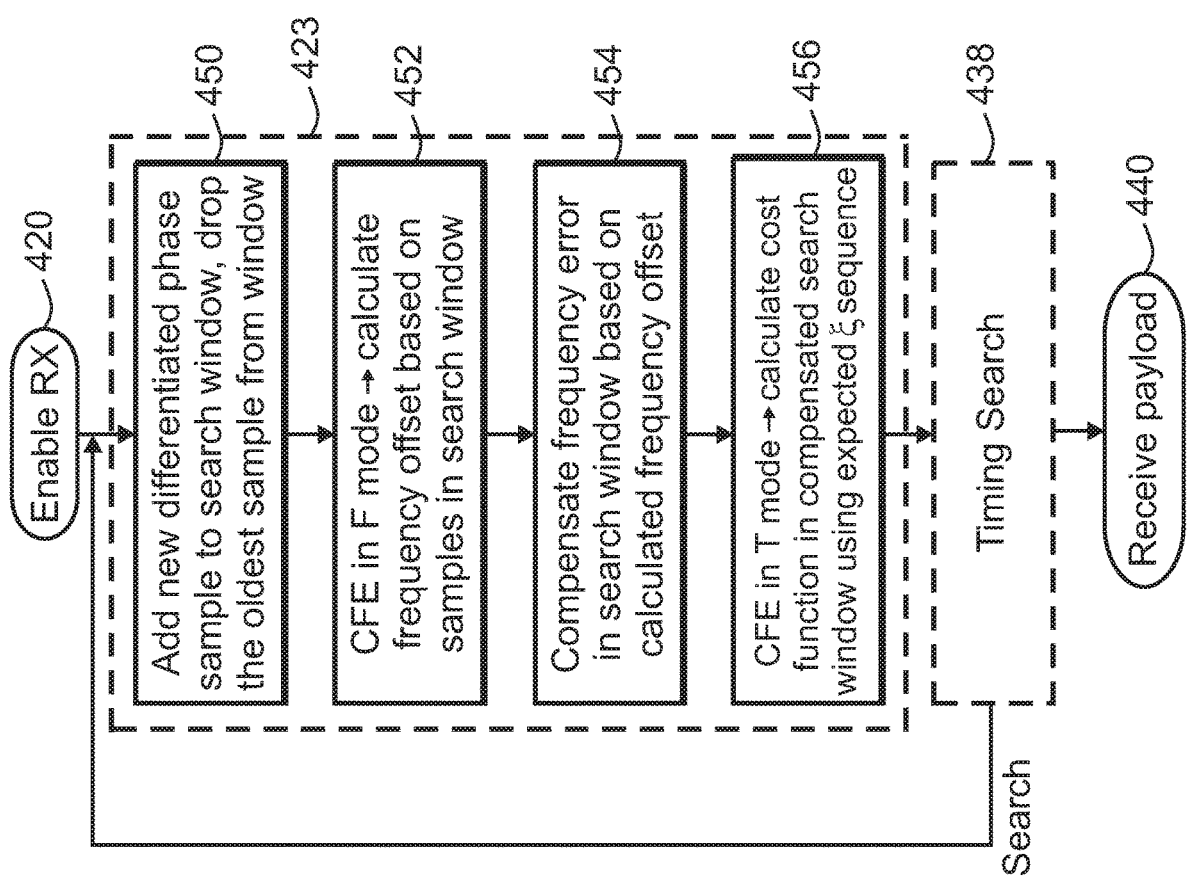
FIG. 10 shows a flow diagram for a process of receiving RF signals according to an exemplary embodiment.

FIG. 10 shows a flow diagram for a process of receiving RF signals according to another exemplary embodiment. More specifically, the figure shows RF receiver operation using a CFC, such as the CFC shown in FIG. 7. For correct operation the ξ-values inside the CFC are programmed so as to match a predefined start sequence, e.g., the sync word. Referring again to FIG. 10, at 420, the receiver is enabled. At 423 (which includes 450, 452, 454, and 456), frequency offset compensation and synch word correlation are performed using the same set of samples. Specifically, at 450, a new differentiated phase sample (e.g., output of phase differentiator 130) is added to the search window, and the oldest differentiated phase sample is dropped from the search window. At 452, the CFC is in the frequency offset compensation mode (F mode), and the frequency offset is calculated based on samples in the search window. At 454, frequency error or offset is compensated in the search window based on the calculated frequency offset. At 456, the CFC is in the timing detection mode (T mode), and the cost function in the frequency-offset-compensated search window is calculated (see FIG. 7). At 438, a timing search is performed. If the timing search does not succeed, control returns to 450. Otherwise, at 440 the payload is received based on the recovered timing. It is also possible to start receiving with the synchronization sequence based on the recovered timing. For example the synchronization sequence may be coded, such as in the BLE coded PHY, and in that case a decoder may be used to receive the synchronization sequence.

Figure 11:
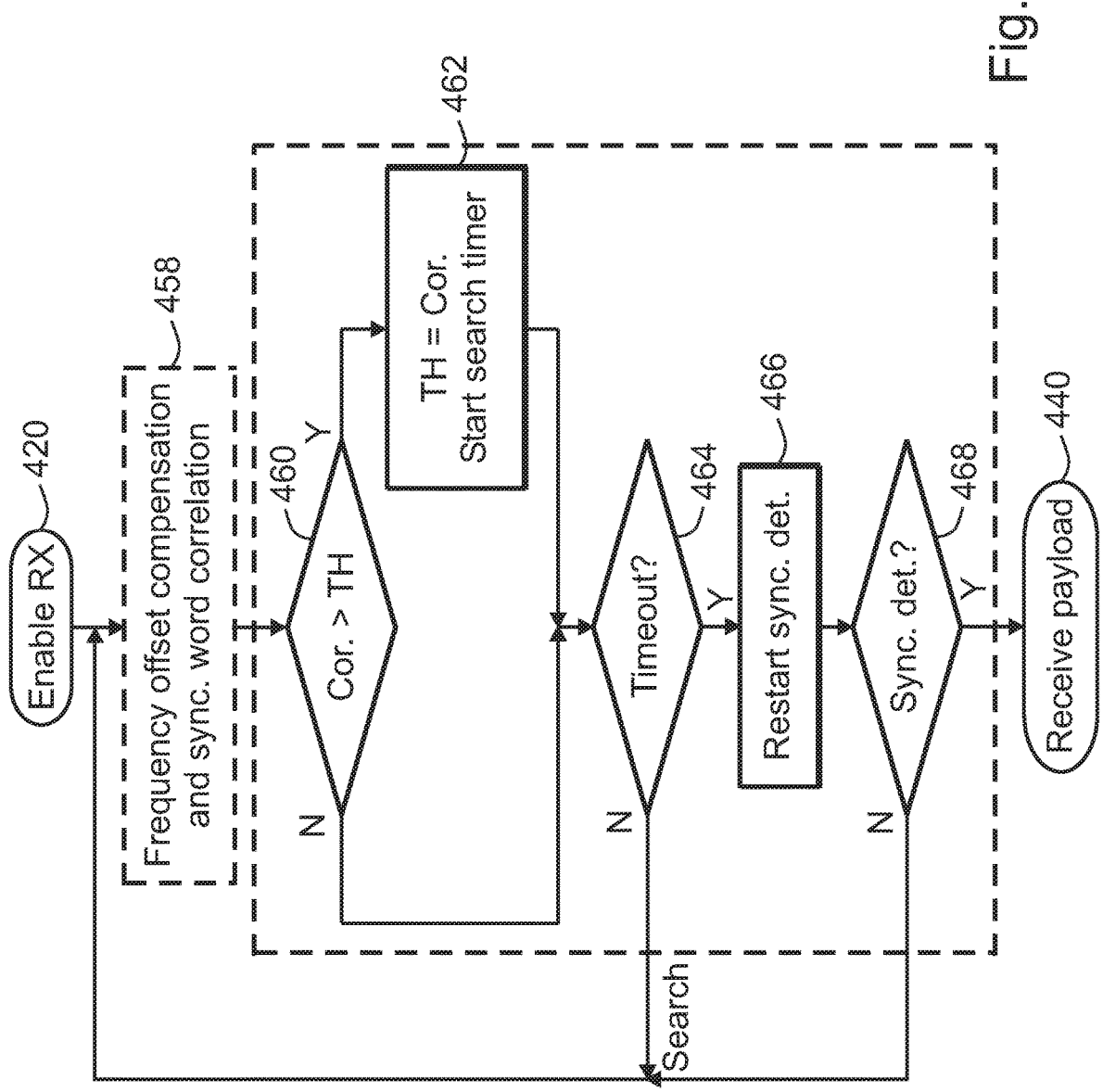
FIG. 11 shows a flow diagram for a process of receiving RF signals according to an exemplary embodiment.
Figure 12:
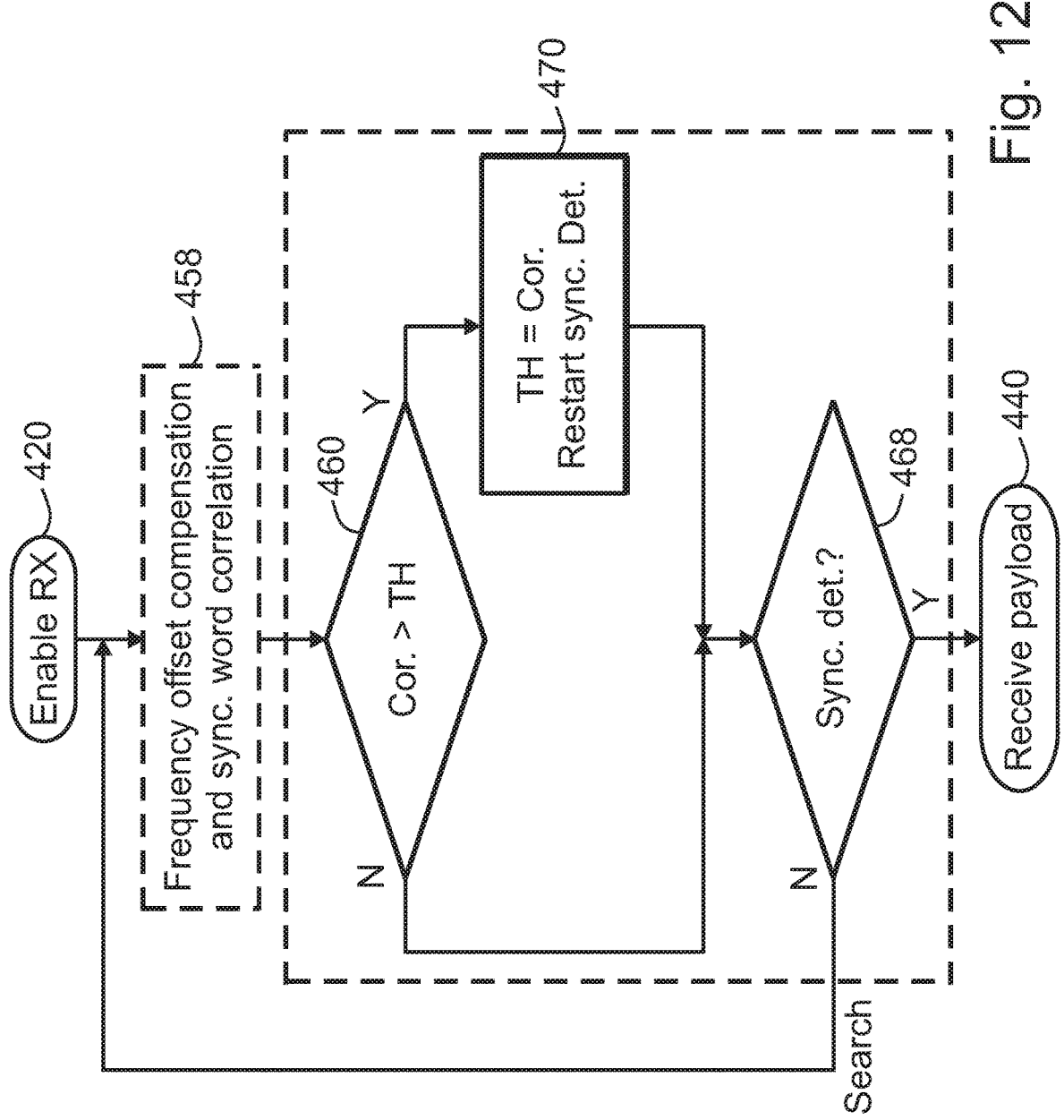
FIG. 12 shows a flow diagram for a process of receiving RF signals according to another exemplary embodiment.
Figure 13:
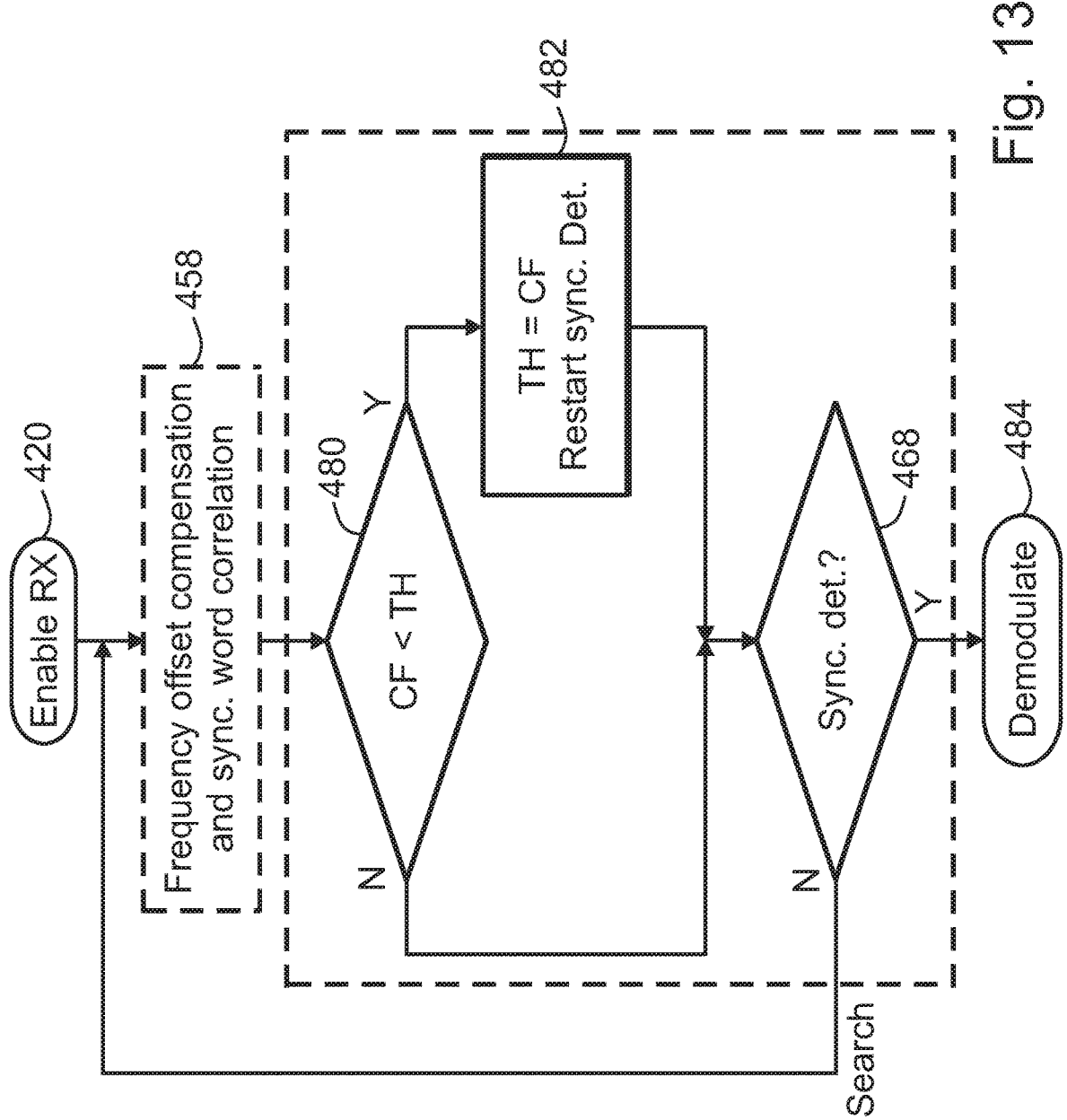

FIGS. 11-13 provide examples of search processes according to exemplary embodiments. Referring to FIG. 11, at 420, the receiver is enabled. At 458, frequency offset compensation and synch word correlation are performed, for example, by using the operations illustrated at 423 in FIGS. 8-9 or other operations, as persons of ordinary skill in the art will understand. Referring again to FIG. 11, at 460, a test is made whether the correlation result exceeds a threshold (TH) value. If so, at 462 the threshold is set to the correlation result, and the search timer is started; otherwise, control is passed to 464. At 464, a check for timer timeout is made. If a timeout has not occurred, control returns to 458. If the search timer was not started, i.e., the correlation never exceeded a threshold (TH) value, then at 464 that scenario would be considered as no timeout. Otherwise, at 466, synch word detection is restarted using the timing associated with the latest threshold (TH) update. At 468, a check is made whether synch word detection has occurred. If not, control returns to 458. Otherwise, at 440 the payload is received, and receive timing is referenced to the last threshold value found by the timing search, described above. Referring to FIG. 12, at 420, the receiver is enabled. At 458, frequency offset compensation and synch word correlation are performed. At 460, a test is made whether the correlation result exceeds a threshold (TH). If so, at 470 the threshold is set to the correlation result, and the synch word detection circuitry is restarted; otherwise, control is passed to 468. At 468, a check is made whether synch word detection has occurred. If not, control returns to 458. Otherwise, at 440 the payload is received, and receive timing is referenced to the last threshold value found by the timing search, described above. Referring to FIG. 13, at 420, the receiver is enabled. At 458, frequency offset compensation and synch word correlation are performed using, for example, the circuit arrangement shown in FIG. 7. At 480, a test is made whether CF (the cost as calculated by the CFC in the timing mode (T mode)) is less than a threshold (TH). If so, at 482 the threshold is set to CF, and the synch word detection circuitry is restarted using the timing associated with the latest threshold (TH) update; otherwise, control is passed to 468. At 468, a check is made whether synch word detection has occurred. If not, control returns to 458. Otherwise, at 484 demodulation of the received signal is performed. Note that the demodulation process uses the latest frequency offset compensation, which is found when the latest threshold value (TH) was found. Furthermore, for demodulation the receiver timing is referenced to the last threshold value (TH) found by the search, described above. In some embodiments, the process shown in FIG. 13 may optionally use a timeout feature, where after the first occurrence of (Cor. <TH), a timer is started. The threshold value (TH) may be reset a default value after a timeout condition occurs.

Figure 14:
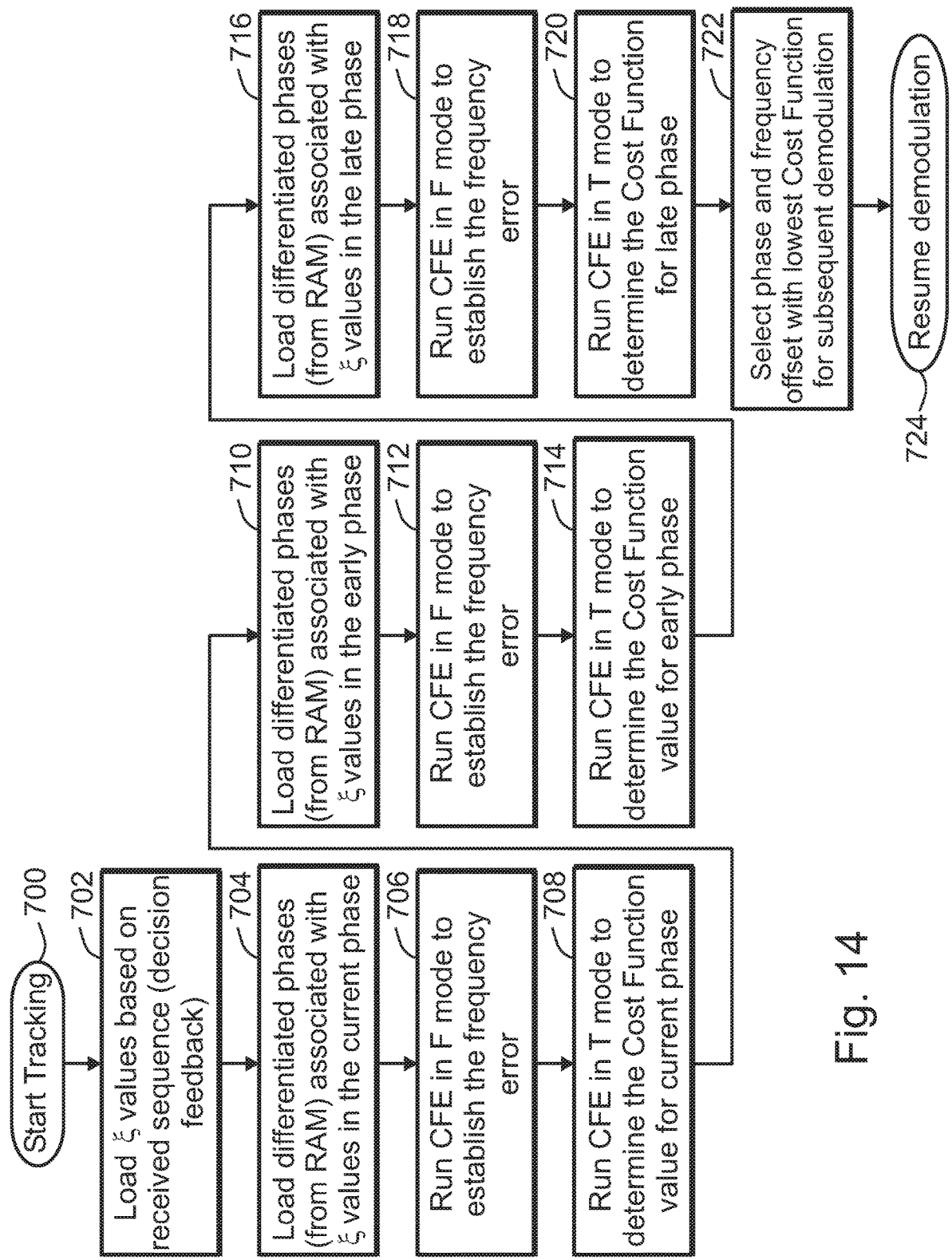
FIG. 14 shows a flow diagram for a process of tracking in an RF receiver according to an exemplary embodiment.

FIG. 14 shows a flow diagram for a process of tracking in an RF receiver according to an exemplary embodiment. At 700, tracking is started. At 702, coefficient (ξ) values are loaded based on the received sequence (e.g., based on the decision feedback, described above). At 704, differentiated phases (from RAM 135) associated with the coefficient (ξ) values in the current phase are loaded. At 706, the CFC is run in the frequency offset compensation mode (F mode) to establish the frequency error. At 708, the CFC is run in the timing tracking mode (T mode) to determine the cost function value for the current phase. At 710, differentiated phases (from RAM 135) associated with the coefficient (ξ) values in the early phase are loaded. At 712, the CFC is run in the frequency offset compensation mode (F mode) to establish the frequency error. At 714, the CFC is run in the timing tracking mode (T mode) to determine the cost function value for the early phase. At 716, differentiated phases (from RAM 135) associated with the coefficient (ξ) values in the late phase are loaded. At 718, the CFC is run in the frequency offset compensation mode (F mode) to establish the frequency error. At 720, the CFC is run in the timing tracking mode (T mode) to determine the cost function value for the late phase. At this point, the frequency errors and cost functions for the early, current, and late phases are known and have been determined. At 722, the phase (early, current, late) and corresponding frequency offset with the lowest cost function are selected for subsequent use in demodulation. At 724, demodulation is resumed or performed.

Figure 15:
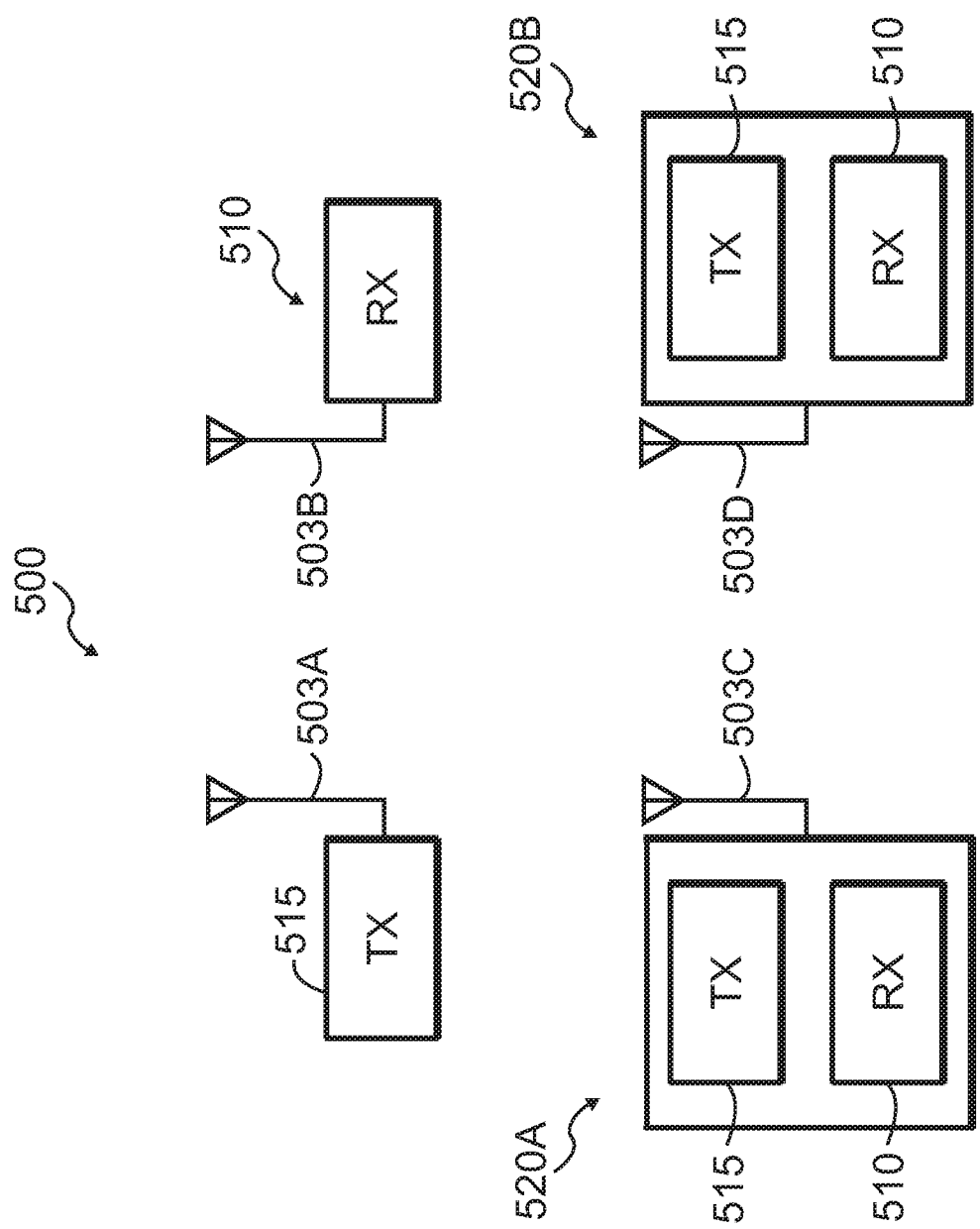
FIG. 15 shows a system for radio communication according to an exemplary embodiment.

According to an aspect of the disclosure, receivers according to exemplary embodiments may be used in a variety of communication arrangements, systems, sub-systems, networks, etc., as desired. FIG. 15 shows a system 100 for radio communication according to an exemplary embodiment. System 100 includes a transmitter 515, coupled to antenna 503A. Via antenna 503A, transmitter 515 transmits RF signals. The RF signals may be received by receiver 510, described above. In addition, or alternatively, transceiver 520A and/or transceiver 520B might receive (via receiver 510) the transmitted RF signals. In addition to receive capability, transceiver 520A and transceiver 520B can also transmit RF signals. The transmitted RF signals might be received by receiver 510, either in the stand-alone receiver, or via the receiver circuitry of the non-transmitting transceiver. Other systems or sub-systems with varying configuration and/or capabilities are also contemplated. For example, in some exemplary embodiments, two or more transceivers (e.g., transceiver 520A and transceiver 520B) might form a network, such as an ad-hoc network. As another example, in some exemplary embodiments, transceiver 520A and transceiver 520B might form part of a network, for example, in conjunction with transmitter 515.

Figure 16:
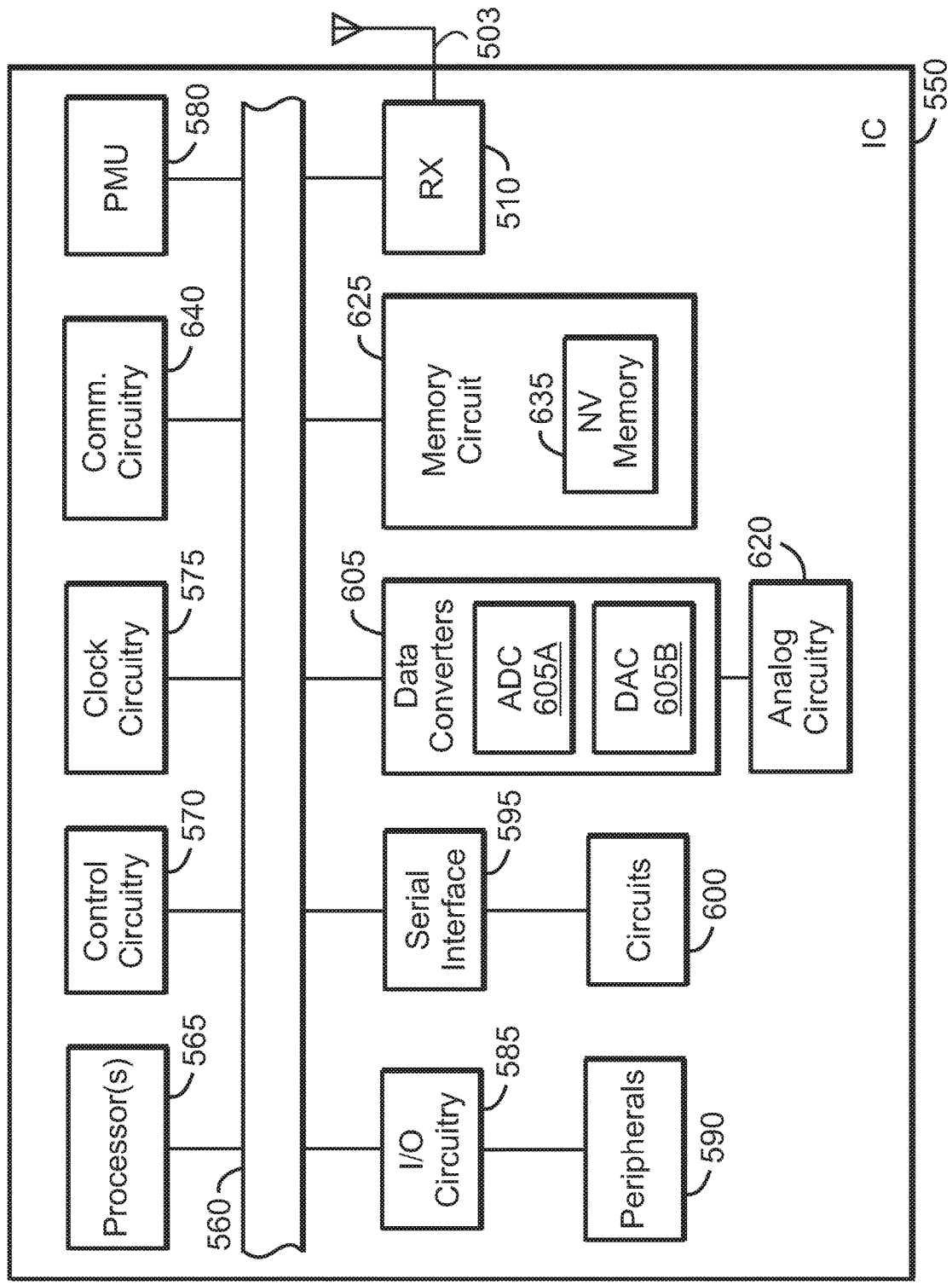
FIG. 16 shows a block diagram of an IC according to an exemplary embodiment.

According to an aspect of the disclosure, RF receivers according to exemplary embodiments may be combined with other circuitry, for example, by integrating the receiver and signal processing, logic, or computing circuitry within an IC. FIG. 16 illustrates an IC 550, for example, a microcontroller unit (MCU), that combines a receiver with other circuit blocks according to an exemplary embodiment. IC 550 constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like. IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired. In addition one or more DSPs may support demodulation functions on signals, such as quadrature, phase and amplitude signals from receiver 510. Demodulation functions may include the execution of the functions shown in FIG. 7, demodulation of modulated signals, Automatic Gain Control (AGC), Automatic Frequency Compensation (AFC), etc.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550. In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand. Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc. In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like. In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above. Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620. Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560. In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as receiver 510, to reset to an initial or known state. In exemplary embodiments, control circuitry 570 may include a variety of types and blocks of circuitry. In some embodiments, control circuitry 570 may include logic circuitry, finite-state machines (FSMs), or other circuitry to perform operations such as the operations described above. As noted above, in some embodiments, control circuitry 570 and/or processor(s) 565 may be used to implement, either in whole or in part, FSM 170 or other blocks or circuitry in RF receiver 510, as desired. Doing so would, as noted above, save semiconductor die area because dedicated hardware to implement (in part or in whole) the functionality of such blocks or circuitry may be omitted from receiver 510. Thus, the functionality of such blocks or circuitry may be implemented in whole or in part by dedicated hardware, in control circuitry 570 (and appropriate firmware, if applicable), and/or processor(s) 565 (and appropriate firmware, if applicable), as desired, and as persons of ordinary skill in the art will understand.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include SPI, I2C, USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc. Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired. In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565. Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to receiver 510, such as parameters, firmware, etc., relating to frequency offset compensation, timing recovery, etc.

As described above in detail, receiver 10/75 receives RF signals via antenna 15, and processes those signals. The resulting data signals are provided to one or more blocks of circuitry in IC 550 via link 560. Furthermore, various blocks of circuitry in IC 550 may be used to process the received data and to generate additional data or signals, which may be used to control other circuitry, etc. In some embodiments, a transmitter (not shown) may be included in IC 550. In such configurations, the transmitter may transmit information generated or processed in IC 550, such as information derived from, based on, or related to data received by receiver 10/75. Thus, sophisticated control and communication subsystems, blocks, circuits, or systems for processing information and/or control may be implemented.

Circuitry described above, such as circuitry shown in FIGS. 6-7, may be used in a variety of applications. Examples include: preamble detection; one-shot AFC (detecting preamble with timing recovery system (TRECS), according to exemplary embodiments, and using measured frequency error, as obtained by the TRECS, and adjust the LO frequency accordingly); tracking AFC (using the measured frequency error, while in tracking mode, to adjust the LO frequency accordingly); and antenna diversity systems (using the timing cost function to estimate signal quality for antenna selection, e.g., during the preamble). To save power consumption the TRECS may also be used to detect the preamble. If no preamble is detected the receiver or IC 550 may enter a low power mode with a wake-up timer enabled. When timeout occurs the receiver will be re-enabled and the preamble detection cycle will be repeated until a valid preamble is detected. When a valid preamble is detected the receiver will remain active to receive the remainder of the frame or packet. A valid signal (e.g., preamble and or sync word) can be detected by the TRECS, but detection reliability may be improved by adding RSSI and spike detection. For example, RSSI may need to exceed a certain threshold before the TRECS detection can be qualified. In addition or instead, the number of detected spikes (also called phase-clicks) should be below a certain threshold during the TRECS detection window. Spikes can be detected from the differentiated phase (typically over sampled, i.e., multiple samples per symbol). A counter can be used to count the spike content during the TRECS window.

Various circuits and blocks described above and used in exemplary embodiments may be implemented in a variety of ways and using a variety of circuit elements or blocks. For example, channel filter 120, Cordic 125, phase differentiator 130, RAM 135, adder 155, timing correlator and frequency offset estimator 160, Viterbi decoder 165, controller 170, DSA 140, initial frequency offset estimator 145, DeMUX 225, divider 230, adder 220, coefficient registers 215, subtractors 205, absolute value circuits 210, FSM 235, coefficient LUT 240, minimum cost calculator circuit 255, address controller 260, coefficient tracking circuit 245, shift register 200, coefficient registers 215, MUX 400, DeMUX 405, shift register 408, MUXs 411, and divide-and-latch circuit 414 may generally be implemented using digital circuitry. The digital circuitry may include circuit elements or blocks such as gates, digital MUXs, latches, flip-flops, registers, FSMs, processors, programmable logic (e.g., field programmable gate arrays (FPGAs) or other types of programmable logic), arithmetic-logic units (ALUs), standard cells, custom cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

As persons of ordinary skill in the art will understand, one may apply the disclosed concepts effectively to various electronic devices, apparatus, circuitry, systems, blocks, and/or subsystems. Examples described in this document (e.g., MCU) constitute merely illustrative applications, and are not intended to limit the application of the disclosed concepts to other types of electronic devices, such as other types of IC, by making appropriate modifications, as persons of ordinary skill in the art will understand.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a radio frequency (RF) receiver, comprising a timing correlator and frequency offset estimator to: (a) extract timing from a set of samples derived from an RF signal, and (b) determine a frequency offset estimate from the set of samples.

2. The apparatus according to claim 1, wherein the timing correlator and frequency offset estimator extracts timing from the set of samples and determines the frequency offset estimate from the set of samples concurrently.

3. The apparatus according to claim 1, wherein the set of samples comprises in-phase and quadrature (IQ) samples.

4. The apparatus according to claim 1, wherein the set of samples comprises phase samples.

5. The apparatus according to claim 1, wherein the timing extraction is performed using a cost function value.

6. The apparatus according to claim 5, wherein the timing correlator and frequency offset estimator comprises a cost function circuit, and wherein the cost function circuit provides the cost function value.

7. The apparatus according to claim 6, wherein the cost function circuit has a timing extraction mode and a frequency offset estimation mode.

8. The apparatus according to claim 6, wherein the cost function circuit comprises:
a first shift register coupled to a set of multiplexers (MUXs);
a second shift register coupled to a set of MUXs;
a set of subtractors coupled to the set of MUXs;
a set of absolute value circuits coupled to the set of subtractors; and
a set of coefficient registers coupled to the set of subtractors.

9. The apparatus according to claim 1, wherein the timing correlator and frequency offset estimator further uses the set of samples to perform frequency offset compensation using the frequency offset estimate.

10. An integrated circuit (IC), comprising:
a radio frequency (RF) receiver, comprising:
a Coordinate Rotation Digital Computer (Cordic) circuit to receive in-phase and quadrature signals derived from RF signals and to generate phase and amplitude signals; and
a timing correlator and frequency offset estimator coupled to receive a set of samples of the phase signals and to perform: (a) timing extraction, and (b) frequency offset estimation.

11. The IC according to claim 10, wherein the timing correlator and frequency offset estimator further uses the set of samples of phase signals to perform frequency offset compensation.

12. The IC according to claim 11, further comprising, wherein the frequency offset compensation is performed within a sample period of the set of samples of the phase signals.

13. The IC according to claim 10, wherein the timing correlator and frequency offset estimator comprises a cost function circuit (CFC) to provide concurrent timing extraction and frequency offset estimation.

14. The IC according to claim 13, wherein the CFC comprises:
a first shift register having a plurality of registers to selectively receive an input signal of the timing correlator and frequency offset estimator;
a second shift register having a plurality of registers to selectively receive an input signal of the timing correlator and frequency offset estimator;
a multiplexer (MUX) having a set of MUXs to selectively provide respective outputs of the first and second shift registers to a plurality of subtractors, wherein the plurality of subtractors subtract a plurality of coefficients and the output signals of a divide-and-latch circuit from corresponding signals from the plurality of registers of the shift register to generate a plurality of difference signals; and a plurality of absolute value circuits to selectively provide as output signals either the plurality of difference signals or absolute values of the plurality of difference signals.

15. A method of receiving radio frequency (RF) signals, the method comprising using a timing correlator and frequency offset estimator to perform:
extracting timing from the RF signals by performing timing correlation on a set of samples derived from the RF signals; and
determining a frequency offset estimate by using the set of samples derived from the RF signals.

16. The method according to claim 15, wherein extracting timing from the RF signals by performing timing correlation on the set of samples derived from the RF signals, and determining the frequency offset estimate by using the set of samples derived from the RF signals are performed concurrently.

17. The method according to claim 15, wherein the set of samples comprises in-phase and quadrature (IQ) samples.

18. The method according to claim 15, wherein the set of samples comprises phase samples.

19. The method according to claim 15, wherein extracting timing from the RF signals by performing timing correlation on a set of samples derived from the RF signals comprises using a cost function.

20. The method according to claim 15, further comprising performing frequency offset compensation using the frequency offset estimate derived from the set of samples.

\* \* \* \* \*